United States Patent
Kasahara et al.

(10) Patent No.: US 9,928,057 B2
(45) Date of Patent: Mar. 27, 2018

(54) METHOD OF PROVIDING A NON-CACHEABLE AREA IN MEMORY

(75) Inventors: Hironori Kasahara, Tokyo (JP); Keiji Kimura, Tokyo (JP); Masayoshi Mase, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 523 days.

(21) Appl. No.: 13/515,759

(22) PCT Filed: Dec. 14, 2010

(86) PCT No.: PCT/JP2010/072457
§ 371 (c)(1),
(2), (4) Date: Jun. 13, 2012

(87) PCT Pub. No.: WO2011/074569
PCT Pub. Date: Jun. 23, 2011

(65) Prior Publication Data
US 2012/0254551 A1 Oct. 4, 2012

(30) Foreign Application Priority Data

Dec. 16, 2009 (JP) .................... 2009-285586

(51) Int. Cl.
*G06F 12/02* (2006.01)
*G06F 9/44* (2018.01)
(Continued)

(52) U.S. Cl.
CPC ............ *G06F 8/70* (2013.01); *G06F 12/0837* (2013.01); *G06F 12/0842* (2013.01)

(58) Field of Classification Search
CPC ..... G06F 8/70; G06F 12/0837; G06F 12/0842
See application file for complete search history.

(56) References Cited

U.S. PATENT DOCUMENTS 5,680,572 A * 10/1997 Akkary et al. ............... 711/126
5,724,549 A * 3/1998 Selgas et al. ................ 711/141
(Continued)

FOREIGN PATENT DOCUMENTS

| JP | 07-295884 A | 11/1995 |
| JP | 09-044403 A | 2/1997 |
| JP | 2004-030362 A | 1/2004 |

OTHER PUBLICATIONS

International Search Report issued in corresponding PCT application No. PCT/JP2010/072457, dated Jan. 18, 2011.
(Continued)

*Primary Examiner* — Arpan P. Savla
(74) *Attorney, Agent, or Firm* — Rankin, Hill & Clark LLP

(57) ABSTRACT

In one or more embodiments, a method of generating a code by a compiler includes: analyzing a program executed by a processor; analyzing data necessary to execute respective tasks included in the program; determining whether a boundary of the data used by divided tasks is consistent with a management unit of a cache memory based on results of the analyzing; and generating the code for providing a non-cacheable area from which the data to be stored in the management unit including the boundary is not temporarily stored into the cache memory and the code for storing an arithmetic processing result stored in the management unit including the boundary into a non-cacheable area in a case where it is determined that the boundary of the data used by the divided tasks is not consistent with the management unit of the cache memory.

15 Claims, 33 Drawing Sheets

(51) Int. Cl.
*G06F 12/0842* (2016.01)
*G06F 12/0837* (2016.01)

(56) References Cited

U.S. PATENT DOCUMENTS

| | | | |
|---|---|---|---|
| 6,138,216 A | 10/2000 | Harvey | |
| 6,219,773 B1* | 4/2001 | Garibay et al. | 711/201 |
| 6,490,661 B1* | 12/2002 | Keller et al. | 711/150 |
| 7,296,122 B2* | 11/2007 | Keller et al. | 711/154 |
| 2001/0037434 A1* | 11/2001 | Hughes | G06F 9/3834 711/146 |
| 2004/0015969 A1* | 1/2004 | Chang | G06F 12/0842 718/100 |
| 2004/0055000 A1 | 3/2004 | Miyake et al. | |
| 2005/0108479 A1* | 5/2005 | Lakshmanamurthy | G06F 12/0811 711/125 |
| 2008/0140938 A1* | 6/2008 | Khemani et al. | 711/133 |

OTHER PUBLICATIONS

English Translation of International Preliminary Report on Patentability Chapter I dated Jan. 18, 2011 issued in corresponding PCT application No. PCT/JP2010/072457, 4 pages.
International Preliminary Report on Patentability Chapter I dated Jan. 18, 2011 issued in corresponding PCT application No. PCT/JP2010/072457, 4 pages.
English Translation of Written Opinion of the International Search Authority dated Jan. 18, 2011 issued in corresponding PCT application No. PCT/JP2010/072457, 3 pages.
Written Opinion of the International Search Authority dated Jan. 18, 2011 issued in corresponding PCT application No. PCT/JP2010/072457, 3 pages.
International Search Report dated Jan. 18, 2011 issued in corresponding PCT application No. PCT/JP2010/072457, 3 pages.
Extended European Search Report issued in corresponding EP application No. 10837595.7, dated Aug. 8, 2014, 7 pages.
Randy Allen and Ken Kennedy, "Optimizing Compilers for Modern Architectures", A Dependence-Based Approach, 2002 Academic Press, pp. 35-39.

* cited by examiner

```
for (i = 0; i < 100; i++)
  for (j = 0; j < 100; j++)
    a[i][j] = ...

for (i = 0; i < 100; i++) {
  for (j = 0; j < 100; j++) {
    ... = b[i][j]

for (i = 0; i < 100; i++)
  for (j = 0; j < 100; j++)
    b[i][j] = ...

for (i = 0; i < 100; i++)
  for (j = 0; j < 100; j++)
    ... = b[i][j]
```

METHOD OF PROVIDING A NON-CACHEABLE AREA IN MEMORY

BACKGROUND OF THE INVENTION

This invention relates to a method of managing memory within a multiprocessor system formed of a plurality of processing elements, and more particularly, relates to a method of controlling data stored in a shared memory so as to maintain consistency (coherency) thereof based on information acquired by a compiler.

Multiprocessor systems in which a plurality of processing elements are integrated have been released one after another by respective microprocessor manufacturers. In the fields of information home electric appliances and device embedding (such as cellular phones, game machines, car navigation systems, digital television receivers, HDD/DVD recorders/players), as well as in the fields of super computers, servers, desktop computers, and PC servers, there is a trend toward employment of multi-core microprocessors.

The multiprocessor system includes a plurality of processing elements, an inter-connection network, and a centralized shared memory, and each of the processing elements includes a processor and a cache memory and independently performs arithmetic processing. The multiprocessor system uses the centralized shared memory as a main memory, and the plurality of processing elements are used as main memory sharing processors that access the same data stored in the centralized shared memory.

In order to maintain the coherency among shared data pieces, it is necessary to perform such coherency control where a processor is accessing a shared data piece on the cache memory, another processor is inhibited from loading the same shared data piece from the centralized shared memory to the cache memory for access thereto.

Herein, the coherency means that all the processors can access a value stored at an address of the memory, as the same value at a given time instant, and refers to control for guaranteeing that contents of the memory accessed by the respective processors are the same within a main memory sharing multiprocessor system. Functions for maintaining the coherency include a coherent cache that controls memory access by hardware.

A first problem to be solved in the coherency control is stale data, and a second problem thereof is false sharing.

FIG. 22 is an explanatory diagram illustrating the first problem (stale data) in the coherency control.

First, global variables a, b, and c are declared (2200), and variables a=0, b=0, and c=1 are stored in the shared memory (2201).

After that, in a case where the shared data (a=0, b=0, and c=1) is stored in the cache memory of a processing element (PE0) (2202) and the same shared data is stored in the cache memory of another processing element (PE1) (2203), even if the shared data is updated (a=0→1) by the PE0, the shared data on the cache of the PE1 is old data that has not been updated (a=0) (2205). In this state, when the shared data is updated (c=a) by the PE1, the variable c is updated to 0 without copying a correct value of a (2206).

Therefore, the variables should be a=1, b=0, and c=1 if the coherency control has been performed, become a=0, b=0, c=0. Therefore, data stored in the cache memory of the PE0 does not match data stored in the cache memory of the PE1. Therefore, the PE1 operates erroneously.

FIG. 23 is an explanatory diagram illustrating the second problem (false sharing) in the coherency control.

First, the global variables a and b are declared (2300), and the variables a=0 and b=0 are stored in the shared memory (2301). The variables a and b are stored on the same cache line of the shared memory. Further, the shared memory is accessed by each line.

After that, the shared data stored in the cache memory of a processing element (PE0) is updated (a=0→1) (2302), and the shared data stored in the cache memory of another processing element (PE1) is updated (b=0→2) (2303). In other words, the respective processing elements update the different variables stored on the same line. In this case, when the PE0 first writes back data to the shared memory, data which the PE1 writes back data later is stored in the shared memory (2304). On the other hand, when the PE1 first writes back data to the shared memory, data which the PE0 writes back data later is stored in the shared memory (2305).

If the coherency control is performed, a=1 and b=2 are stored in the shared memory, but if the coherency control is not performed, it is not certain which data is finally stored in the shared memory. In other words, the contents of the memory differ depending on a line destaging timing, and the processing element cause an erroneous operation in any case.

In order to solve such a problem that a mismatch occurs between the shared memory and the cache memory, a coherency control module is provided to the respective processing elements and shared resources (such as the inter-connection network and the shared memory), to thereby maintain the coherency of the data stored in the memory.

Specifically, until a processing element (PE0) reads data x from the shared memory, updates the data x, and discards ownership of the data x, another processing element (PE1) is not permitted to write the data x to the shared memory.

Through such ownership control, it is possible to solve the problems of the stale data and the false sharing which reside in the coherency control.

CITATION LIST

Patent Literature

PTL 1: JP 2004-30362 A
PLT 2: JP H9-44403 A

SUMMARY OF THE INVENTION

However, with the coherent cache that controls the ownership of the memory access by using hardware, an increase in the number of processors due to cost of hardware causes an increase in cost of the multiprocessor system. Further, the memory access is controlled by hardware, which results in slow memory access.

In addition, in coherency control performed by using hardware, signals are sent to all the processors, the memory, and a bus control mechanism for every event, which causes overhead at a time of execution. The overhead increases in accordance with the number of processors included in the multiprocessor system. Therefore, if the number of processors increases, a bus is occupied by communications for the coherency control, which hinders the operation of the processor.

Therefore, there is a demand for the coherency control performed with a simple hardware configuration, in particular, the coherency control performed by using software.

A representative example of the invention disclosed herein is as follows. Specifically, a method of generating a code by a compiler is provided, the code being executable by a processor provided to a multiprocessor system. The multiprocessor system includes a plurality of processing elements and a main memory that can be accessed from each of the plurality of processing elements. The processing elements include a processor for performing arithmetic processing and a cache memory for temporarily storing data used by the processor. The data read and transferred by the processing elements from the main memory is temporarily stored in the cache memory. When use of data by the processing elements has finished, the data is transferred from the cache memory and written back to the main memory. The data transfer between the main memory and the cache memory is performed in accordance with a management unit of the cache memory. The method includes the steps of: analyzing a program to be executed by the multiprocessor system; analyzing data necessary to execute respective tasks included in the program; determining whether a boundary of the data used by the divided tasks is consistent with the management unit of the cache memory based on results of the analyzing in a case where the respective tasks are divided; and generating a code for instructing to provide a non-cacheable area from which the data to be stored in the management unit including the boundary is not temporarily stored into the cache memory and a code for instructing to store an arithmetic processing result stored in the management unit including the boundary into the non-cacheable area in a case where it is determined that the boundary of the data used by the divided tasks is not consistent with the management unit of the cache memory.

According to representative embodiments of this invention, it is possible to simplify hardware. Therefore, it is possible to realize a low-cost and low-power-consumption multiprocessor system.

DETAILED DESCRIPTION OF THE PREFERRED EMBODIMENTS

Figure 1:
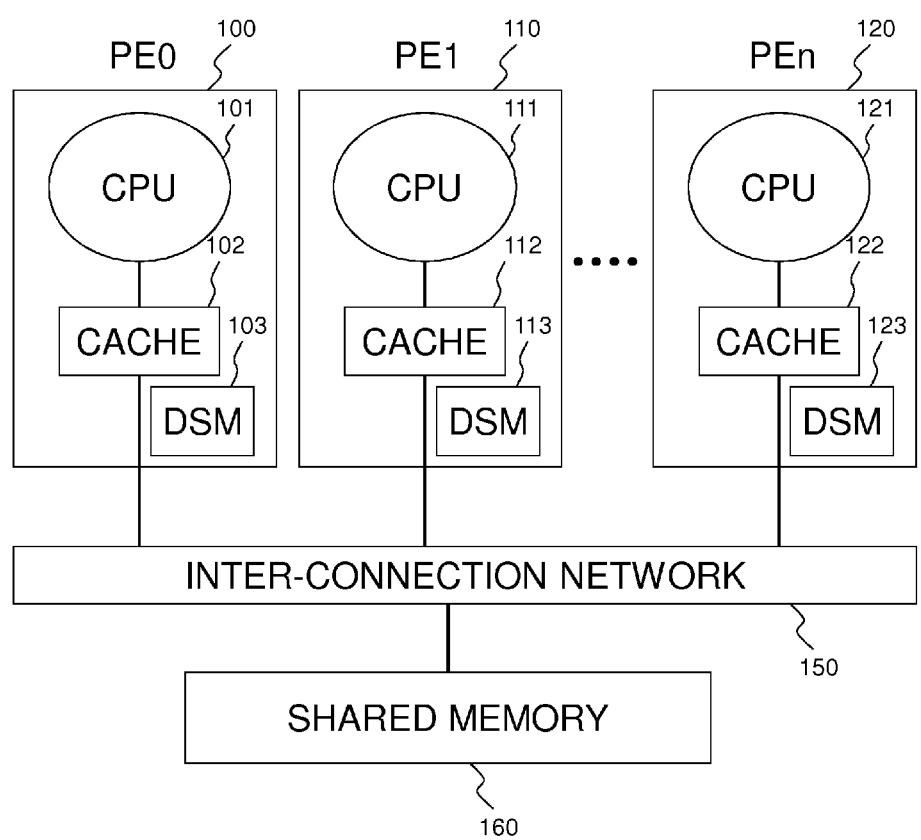
FIG. 1 is a configuration diagram of a multiprocessor system according to embodiments of this invention.

FIG. 1 is a configuration diagram of a multiprocessor system according to embodiments of this invention.

The multiprocessor system according to the embodiments of this invention includes a plurality of processing elements (PE0, PE1, . . . , PEn) 100, 110, and 120, an inter-connection network 150, and a centralized shared memory 160.

The processing element (CPU) 100 includes a processor 101 for performing arithmetic processing, a cache memory 102 for temporarily storing data, a distributed shared memory (DSM) 103, and a transfer data controller, and independently operates.

The processor 101 can be any processor capable of an integer arithmetic processing and a floating point arithmetic processing, and the function thereof is not specifically limited. For example, a CPU of the single-issue RISC architecture which is simple in architecture of loading/storing data may be used. Moreover, a superscalar processor, a VLIW processor, and the like may be used.

The cache memory 102 is a memory for temporarily storing data read by the processor 101 from the centralized shared memory 160. The processor 101 performs the arithmetic processing by using the data stored in the cache memory 102. After the arithmetic processing performed by the processor 101 is finished, the data stored in the cache memory 102 is written back to the centralized shared memory 160. Data is read/written between the cache memory 102 and the centralized shared memory 160 line by line. A line is a management unit for the data stored in the cache memory 102.

It should be noted that the processing element 100 may use the cache memory 102 as a secondary cache and include a primary cache in addition to the cache memory 102. In this case, the primary cache and the secondary cache (cache memory 102) may be subject to coherency control. In other words, the multiprocessor system according to the embodiments of this invention does not include a coherency function for maintaining equality of data between the centralized shared memory 160 functioning as a main memory and the cache memory 102 that is provided on an outermost side.

The distributed shared memory 103 is a memory capable of reading/writing the stored data directly from another processing element. It should be noted that, if the distributed shared memory 103 is formed of a dual port memory, the distributed shared memory 103 can be accessed without a conflict between the processor 101 and the transfer data controller. It should be noted that the distributed shared memory 103 is not essential to the multiprocessor system according to this embodiment.

The transfer data controller transfers data stored in the memory of the processing element between the different processing elements.

Further, in addition to the components illustrated in the figure, the processing element 100 may include a local program memory, a local data memory, a network interface, and a power control register.

It should be noted that the processing elements 110 and 120 also include the same components as those of the processing element 100.

The inter-connection network 150 is realized by an existing coupling technology (such as a crossbar switch, a bus, or a multistage network), and couples the plurality of processing elements 100 and the like and the centralized shared memory 160 to each other.

The centralized shared memory (CSM) 160 functions as the main memory that stores data shared by all the processing elements 100 and the like across a system, and is capable of being accessed from the respective processing elements 100 and the like.

It should be noted that the multiprocessor system according to this embodiment does not include the coherency function as hardware for maintaining the equality (consistency) of the data between the cache memory 102 and the like and the centralized shared memory 160.

Solution to Stale Data

A method of avoiding occurrence of stale data being the first problem is described herein.

As described above, the multiprocessor system according to the embodiments of this invention do not include the coherency function by hardware for maintaining the equality of the data between the cache memory 102 and the like and the centralized shared memory 160. Therefore, if a processing element updates the data on a cache memory, the other processing element is not notified of the data update. Further, the updated data is not even copied to the centralized shared memory 160 until the updated data is written back.

Therefore, a compiler according to the embodiments of this invention generates an explicit cache manipulation code by software based on results (data control flow and data dependence relationship) of analyzing a program.

The cache manipulation code to be generated is only a command for manipulating the data stored in the cache memory of the processing element that executes the command, and is not a command for manipulating a state of the data stored in the cache memory of the other processing element such as a cache manipulation request in a coherency protocol by hardware. The cache manipulation code to be generated includes three kinds of commands including writeback, self-invalidate, and purge.

Writeback is a command for writing back the data stored in the cache memory 102 to the centralized shared memory 160. When the data is updated on the cache memory 102 and becomes different from the data stored in the centralized shared memory 160 at an address corresponding thereto, the state of the line becomes dirty, and the data stored in the cache memory 102 needs to be written back to the centralized shared memory 160.

It should be noted that the data is also written back to the centralized shared memory 160 by writeback of the data accompanied by line replacement of the cache memory 102 (auto-writeback).

The self-invalidate is a command for invalidating the line of the cache memory 102. Even if being stored in the cache memory, the data invalidated, by the self-invalidate cannot be used until the data is read from the centralized shared memory 160 again.

The purge is a command for executing the self-invalidate after the writing back (writeback) of the data stored in the line of the cache memory 102.

Further, the cache manipulation code is inserted in a portion in which communications occur between tasks executed by the respective processing elements.

In addition, in a case where different processing elements retain the data on the same line, the compiler controls the data on the same line stored in the different processing elements so as not to be simultaneously updated.

Figure 2:
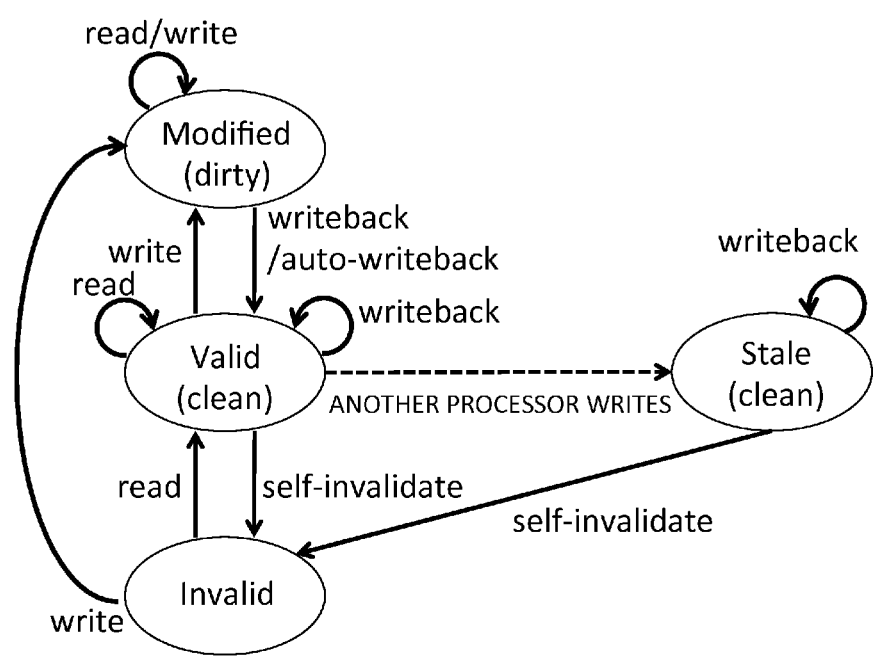
FIG. 2 is a diagram illustrating a state that can be taken by each line of a cache memory of the multiprocessor system according to the embodiments of this invention.

FIG. 2 is a diagram illustrating a state that can be taken by each line of the cache memory 102 of the multiprocessor system according to the embodiments of this invention.

The cache memory 102 takes four states of "Modified", "Valid", "Stale", and "Invalid" for each line.

The "Modified" state indicates that dirty data obtained by updating the data is stored in the cache memory 102, and represents a state of being different from the data stored in the centralized shared memory 160 at the corresponding address. In this case, the data stored in the cache memory 102 needs to be written back to the centralized shared memory 160 by the writeback.

The "Valid" state represents a clean state in which the data stored in the cache memory 102 matches the data stored in the centralized shared memory 160 at the corresponding address.

The "Stale" state represents a clean state in which data to be synchronized with the data stored in the cache memory 102 has been rewritten by the other processing element, but the updated data has not been written back to the centralized shared memory 160 yet, and hence the cache data matches the data stored in the centralized shared memory 160 at the corresponding address.

The "Invalid" state represents a state in which data may not match the data stored in the cache memory 102.

Transition between the above-mentioned four states is controlled by access to the cache memory 102 and cache manipulation.

The access to the cache memory 102 includes reading (read) data from the centralized shared memory 160 by the processor 101 and writing (write) data to the cache memory 102 by the processor 101.

The compiler according to the embodiments of this invention controls the data on the same line stored in the cache memories of the plurality of processing elements so that the data does not simultaneously take the "Modified" state. Further, the compiler according to this embodiment controls the "Stale" data so as not to be read/written.

Figure 3A:
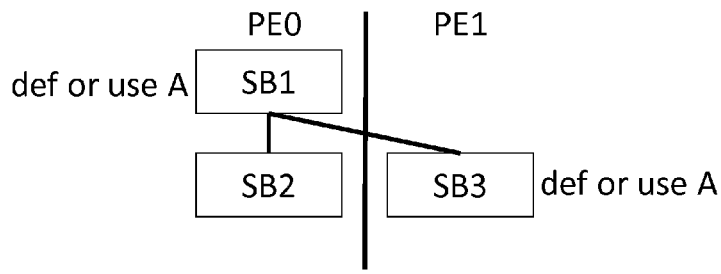
FIG. 3A is an explanatory diagram illustrating a method of avoiding consumption of stale data according to the embodiments of this invention.
Figure 3B:
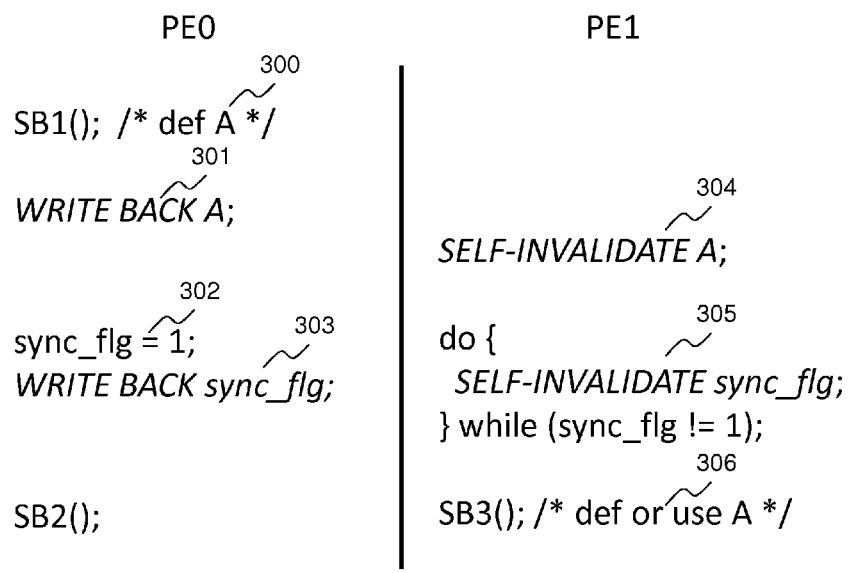
FIG. 3B is an explanatory diagram illustrating the method of avoiding consumption of the stale data according to the embodiments of this invention.

FIGS. 3A and 3B are explanatory diagrams illustrating a method of avoiding consumption of the stale data according to the embodiments of this invention.

In a case where data dependence exists across the processing elements, the compiler according to the embodiments of this invention synchronizes the data at an edge of the data dependence. For example, the edge of the data dependence to be detected by the compiler based on analysis of the program is a def-use relationship caused by flow dependence.

For example, as illustrated in FIG. 3A, the PE0 defines a variable A in a task block 1 (SB1) (300) and then the PE1 uses the variable A in a task block 3 (SB3). As illustrated in FIG. 3B, the PE1 changes the state of the line that stores the variable A to "Invalid" in accordance with the update of the variable A performed by the PE0 (304). Further, after the PE0 writes back the variable A to a centralized shared memory (301), the PE1 uses the variable A.

More specifically, before the other processing element (PE1) uses the variable A updated by the PE0, the compiler inserts a writeback command (301). In this case, next time the own processing element (PE0) uses the variable A, the writeback command is not inserted, and the writeback command may be inserted before the other processing element (PE1) uses the variable A.

In addition, for data synchronization between the processing elements using a flag variable, the compiler inserts a command (302) to write a value indicating synchronization to a synchronization flag variable (sync_flg) on a send side (PE0) of the synchronization, and inserts a command (303) to write back the line of the cache memory that stores the synchronization flag variable to the centralized shared memory.

On the other hand, with regard to the PE1, the compiler inserts a self-invalidate command (304) before using the variable A updated by the other processing element (PE0). It should be noted that it is desired that the portion in which the self-invalidate command (304) is inserted (timing for self-invalidation) be immediately before the variable A is used.

In addition, the compiler repeatedly invalidates and reads the synchronization flag variable (sync_flg), and inserts a command (305) to stand by in a busy wait state until the value of the synchronization flag variable is updated to the value indicating the synchronization.

The variable A is invalidated and the PE1 cannot use the variable A on the cache memory. Therefore, the PE1 loads the variable A from the centralized shared memory 160 to the cache memory, and acquires the variable A updated by the PE0.

The def-use relationship is described above, but a def-def relationship exhibited by output dependence, a use-def relationship based on reverse dependence, and a use-use relationship based on input dependence can cause the same situations.

In this manner, the compiler according to the embodiments inserts a cache manipulation command in accordance with the result of analyzing the flow dependence and the output dependence between the tasks, and hence the stale data is not consumed without performing the coherency control.

Solution to False Sharing

Next, a method of avoiding occurrence of false sharing being the second problem is described.

Figure 4:
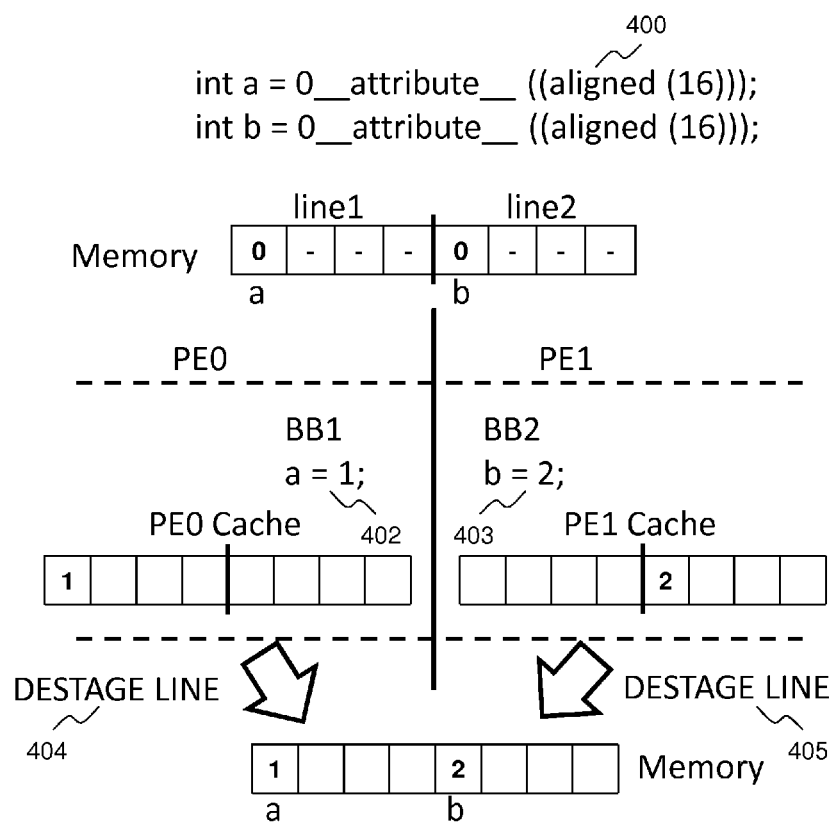
FIG. 4 is an explanatory diagram illustrating an outline of a method of avoiding occurrence of false sharing according to the embodiments of this invention.

FIG. 4 is an explanatory diagram illustrating an outline of a method of avoiding an occurrence of the false sharing according to the embodiments of this invention.

In this embodiment, in order to prevent the variables used by the respective processing elements from falling on the same cache line, alignment for placing the respective variables at heads of the cache lines is performed. It should be noted that the alignment of the variables may be designated by declaration of an array variable, or may be separately described in a setting file or the like.

Figure 23:
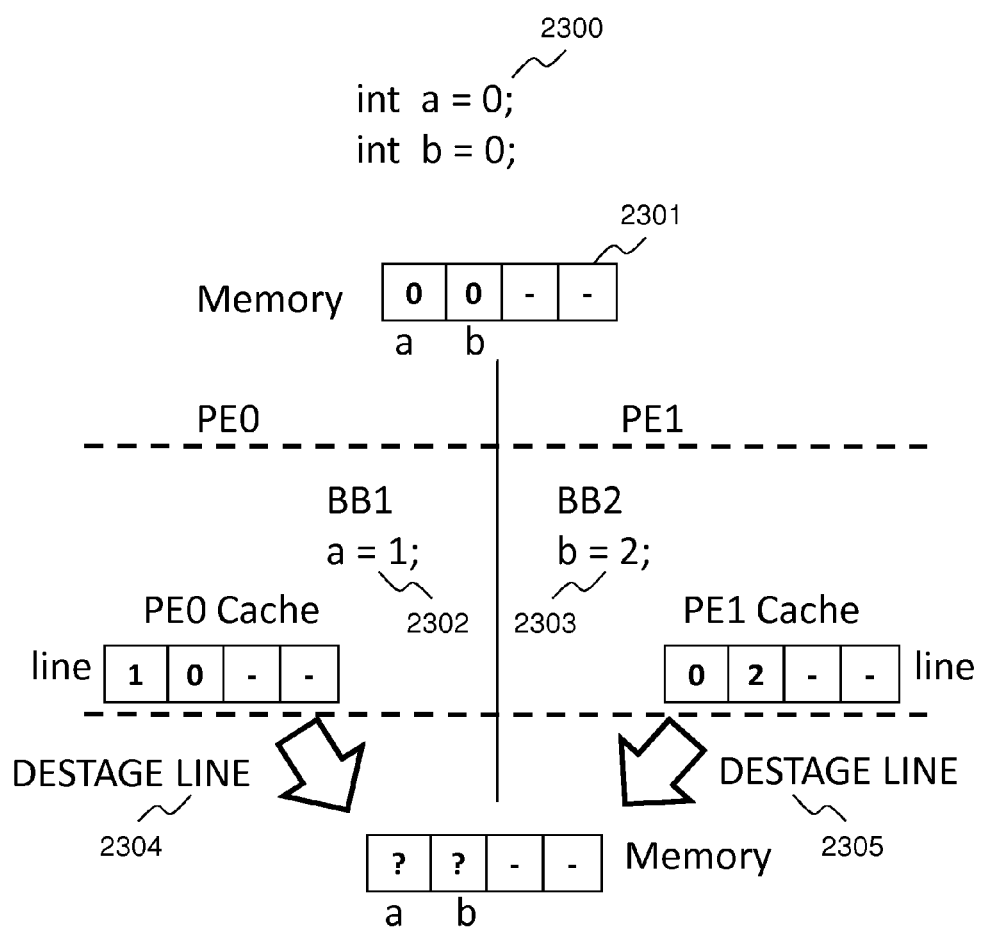
FIG. 23 is an explanatory diagram illustrating a second problem (false sharing) in the coherency control.

First, in a similar manner as described above with reference to FIG. 23, global variables a and b are declared (400), and the variables a=0 and b=0 are stored in the centralized shared memory 160. However, in the embodiments of this invention, unlike the manner described above with reference to FIG. 23, the declared global variables a and b are placed at the heads of the cache lines of the centralized shared memory 160, thereby being stored on the different lines.

After that, shared data on the cache of a processing element (PE0) is updated (a=0→1) (402), and shared data on the cache of the other processing element (PE1) is updated (b=0→2) (403). However, the respective processing elements update the different variables stored on the different lines, and hence even when the respective processing elements write back the data stored in the cache memory to the centralized shared memory 160 at any time (404 and 405), correct data pieces (a=1 and b=2) are stored in the centralized shared memory 160.

Next, a case of handling a one-dimensional array is described.

Figure 5A:
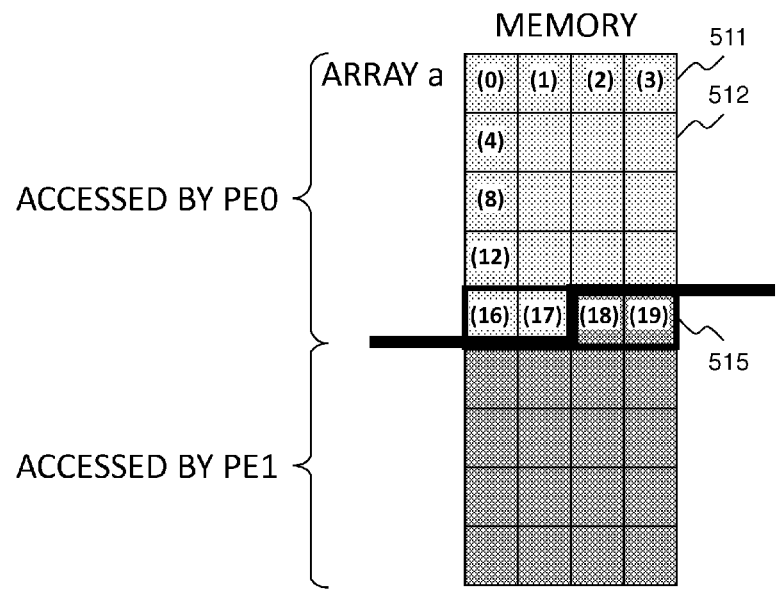
FIG. 5A is an explanatory diagram illustrating an example in which the false sharing occurs among elements of an array variable in the case of handling a one-dimensional array.
Figure 5B:
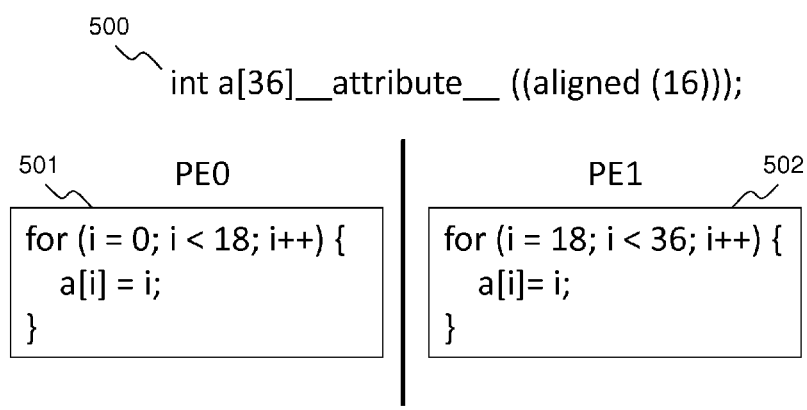
FIG. 5B is an explanatory diagram illustrating the example in which the false sharing occurs among the elements of the array variable in the case of handling the one-dimensional array.

FIGS. 5A and 5B are explanatory diagrams illustrating an example in which the false sharing occurs among the elements of the array variable in the case of handling the one-dimensional array.

First, as illustrated in FIG. 5B, the global variable a is declared, and the variable a is placed at the head of the line of the centralized shared memory (head of the line of the cache memory) (500). The embodiments are directed to a case where four variables can be stored in one 16-byte line of the cache memory. Therefore, as illustrated in FIG. 5A, a[0] to a[3] are stored in a first line 511 of the cache memory, a[4] to a[7] are stored in a second line 512, and a[16] to a[19] are stored in a fifth line 515.

After that, the processing element (PE0) 100 processes the variable a[i] ($0 \leq i < 18$) (first data) on the cache memory 102 (501), the processing element (PE1) 110 processes the variable a[i] ($18 \leq i < 36$) (second data) on a cache memory 112 (502), and the PE0 and the PE1 write back the results of the processing from the cache memories 102 and 112 to the centralized shared memory 160.

Writeback of the data from the cache memories 102 and 112 to the centralized shared memory 160 is performed for each line. Since a[16] and a[17], processed by the PE0, and a[18] and a[19], processed by the PE1, exist on the fifth line 515, a conflict occurs between the access by the PE0 and the access by the PE1 on this line, and false sharing occurs as a result.

Figure 6A:
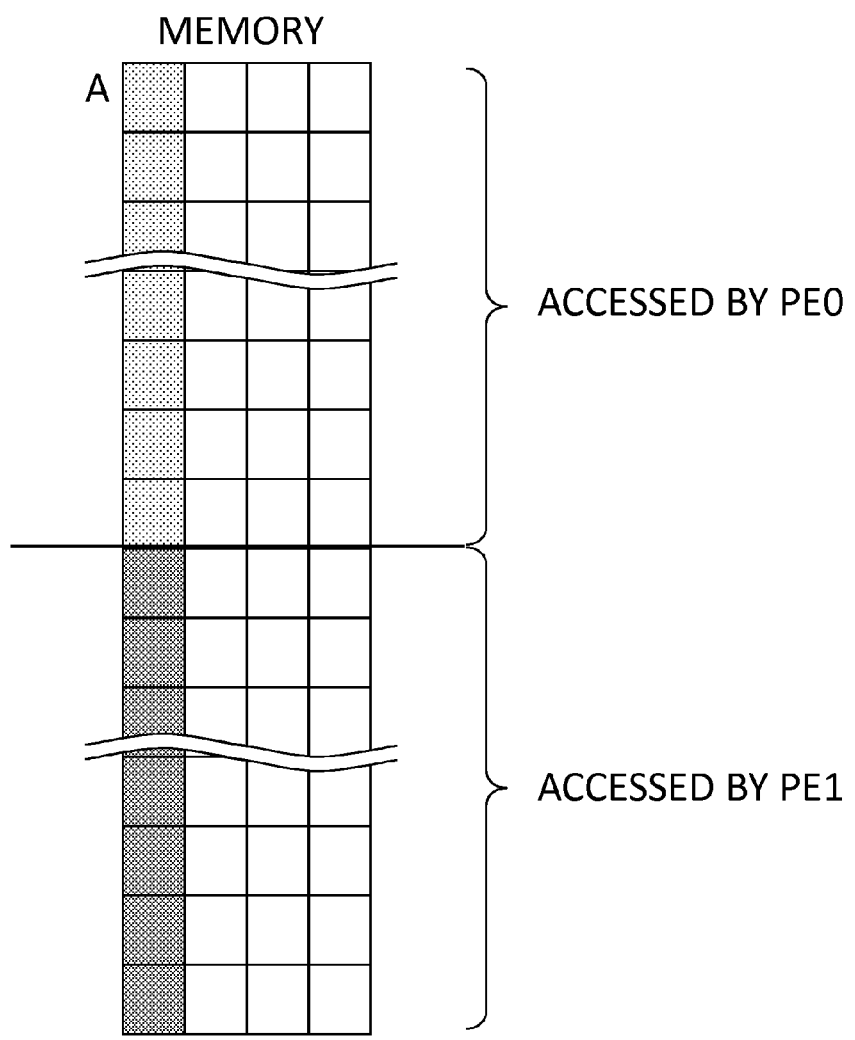
FIG. 6A is an explanatory diagrams illustrating a method of avoiding occurrence of the false sharing according to a first embodiment of this invention.
Figure 6B:
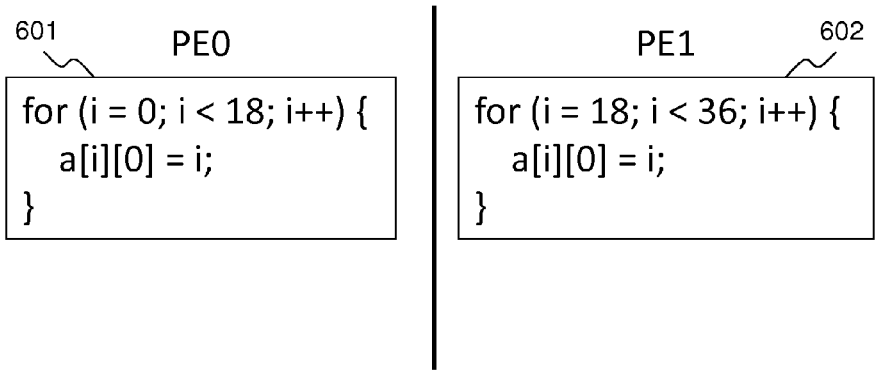
FIG. 6B is an explanatory diagrams illustrating the method of avoiding the occurrence of the false sharing according to the first embodiment of this invention.

FIGS. 6A and 6B are explanatory diagrams illustrating a method of avoiding the occurrence of the false sharing according to a first embodiment of this invention.

In the method of the first embodiment, as illustrated in FIG. 6A, by placing the respective elements of the global variable a at the heads of the lines of the centralized shared memory (heads of the lines of the cache memory), and hence the respective elements are placed on the different lines. Therefore, the processing is divided by a boundary between the cache lines.

First, as illustrated in FIG. 6B, the global variable a is declared, and the respective thirty-six elements of the array variable included in the variable a are placed at the heads of the lines of the centralized shared memory (heads of the lines of the cache memory) (600).

After that, the processing element (PE0) 100 processes the variable a[i] ($0 \leq i < 18$) (601), the processing element (PE1) 110 processes the variable a[i] ($18 \leq i < 36$) (602), and the PE0 and the PE1 write back the results of the processing to the centralized shared memory 160. However, unlike the case described above with reference to FIG. 5A, the PE0 and the PE1 do not access the same line of the centralized shared memory 160, as illustrated in FIG. 6B. Therefore, the plurality of processing elements do not write back the data to the same line, and hence the false sharing does not occur.

It should be noted that, in this embodiment, a line has a capacity to store four variables (but only one variable is store in a line), which reduces use efficiency of the cache memory. Therefore, this embodiment is effective in a case where the number of elements of the array variable is small. Further, this embodiment is effective in a case where the same processing element performs indirect memory access such as accessing elements of different subscripts of the array variable (a(i) and a(i+1)).

Figure 7A:
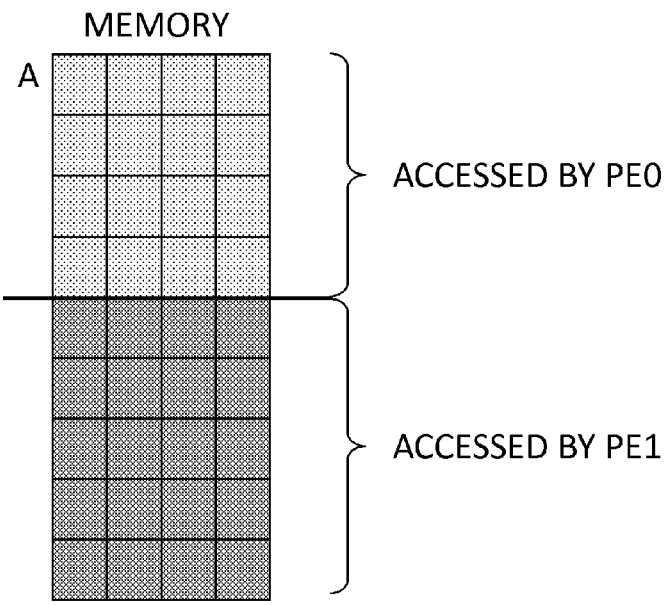
FIG. 7A is an explanatory diagram illustrating a method of avoiding occurrence of the false sharing according to a second embodiment of this invention.
Figure 7B:
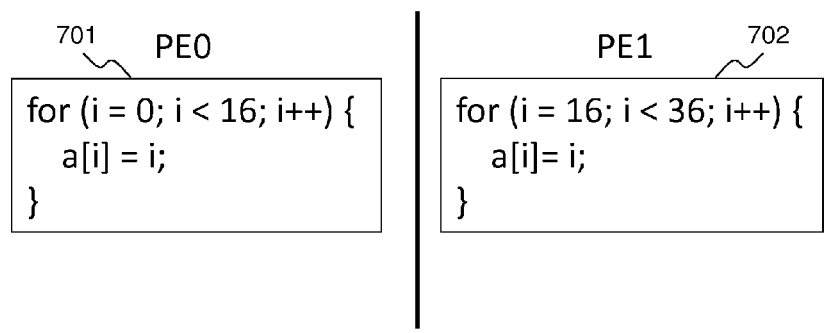
FIG. 7B is an explanatory diagram illustrating the method of avoiding the occurrence of the false sharing according to the second embodiment of this invention.

FIGS. 7A and 7B are explanatory diagrams illustrating a method of avoiding the occurrence of the false sharing according to a second embodiment of this invention.

As described above with reference to FIG. 5A, the false sharing occurs when the data processed by the different processing elements is stored on one line of the cache memory. Therefore, in this embodiment, as illustrated in FIG. 7A, the data processed by the respective processing elements is divided by the boundary of the line of the cache memory so as to avoid the data processed by the plurality of processing elements from being stored on one line of the cache memory.

First, as illustrated in FIG. 7B, the global variable a is declared, and the variable a is placed at the head of the line of the centralized shared memory (head of the line of the cache memory) (700).

After that, the processing element (PE0) 100 processes the variable a[i] ($0 \leq i < 16$) (701), and the processing element (PE1) 110 processes the variable a[i] ($16 \leq i < 36$) (702). After that, the PE0 writes back the result of the processing from the cache memory 102 to the centralized shared memory 160, and the PE1 writes back the result of the processing from the cache memory 112 to the centralized shared memory 160.

In this embodiment, one line has the capacity that can store four variables, and hence the respective processing elements are configured to process the elements of the array variable, the number of which is a multiple of four, because four is the cache line size. Therefore, as illustrated in FIG. 7A, an access range of the PE0 and an access range of the PE1 are divided by the boundary of the line of the cache memory, and the PE0 and the PE1 do not access the same line of the cache memory. Therefore, the plurality of processing elements do not write back the data to the same line, and hence the false sharing does not occur.

It should be noted that, in this embodiment, the processing of sixteen and twenty elements of the array variable is allocated to the PE0 and the PE1, respectively, but the processing of twenty and sixteen elements of the array variable may be allocated to the PE0 and the PE1, respectively, as long as the elements are divided into a multiple of the cache line size (number of elements of the array variable that can be stored on one line). Further, the processing using the elements of the array variable, the number of which is based on a ratio of processing performance of the respective processing elements, may be allocated.

It should be noted that, in this embodiment, the numbers of elements of the array variable allocated to the respective processing elements may not be equal to each other depending on the cache line size, the number of elements of the array variable, and the number of processing elements, and an imbalance may occur in processing load on the processing element. Therefore, this embodiment is effective in a case where an array size is sufficiently large and the imbalance is small enough to be ignored compared to the array size.

Figure 8A:
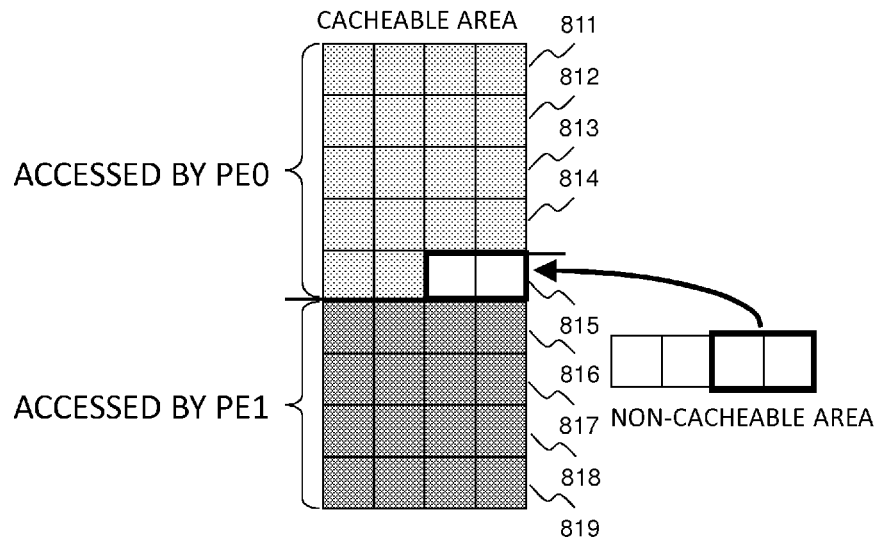
FIG. 8A is an explanatory diagram illustrating a method of avoiding occurrence of the false sharing according to a third embodiment of this invention.
Figure 8B:
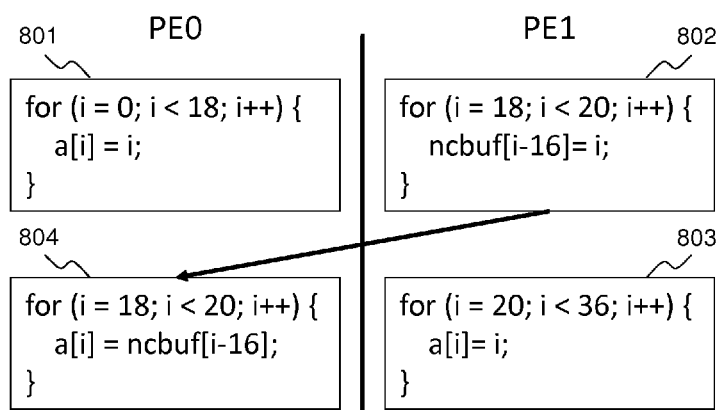
FIG. 8B is an explanatory diagram illustrating the method of avoiding the occurrence of the false sharing according to the third embodiment of this invention.

FIGS. 8A and 8B are explanatory diagrams illustrating a method of avoiding the occurrence of the false sharing according to a third embodiment of this invention.

In the third embodiment, a non-cacheable area is used in the boundary of the processing, to thereby avoid the occurrence of the false sharing.

First, as illustrated in FIG. 8B, the global variable a and a variable ncbuf are declared, the variable a is placed at the head of the line of the centralized shared memory (head of the line of the cache memory), and the variable ncbuf, which has a size of four elements of the array variable is provided to the non-cacheable area (800).

The non-cacheable area represents an area that is used, when the processing element reads the data stored in the area from the memory, without loading the read data in the cache memories of the respective processing elements. The non-cacheable area is distinguished from a normal cacheable area by designating an area (address) of the memory or a specific variable as being non-cacheable. The designation of being non-cacheable may be previously defined by a predetermined setting file, or may be defined by a command that declares the variable.

After that, the processing element (PE0) 100 processes the variable a[i] ($0 \leq i < 18$) on the cache memory (801), the processing element (PE1) 110 processes the variable a[i] (i=18, 19) on the non-cacheable area by using ncbuf[i] (i=2, 3) (802), and the PE1 processes the variable a[i] ($20 \leq i < 36$) on the cache memory (803).

After that or in parallel with the processing 803, the PE0 reads the variable ncbuf[i] (i=2, 3) processed by the PE1 from the non-cacheable area, and writes the variable ncbuf[i] (i=2, 3) to the variable a[i] (i=18, 19) of the cache memory of the PE0 (804). By the above-mentioned data dependence, the variable a[i] (i=18, 19) processed by the PE1 is transferred to the PE0.

After that, the PE0 writes back the variable a[i] ($0 \leq i < 20$) to the centralized shared memory 160, and the PE1 writes back the variable a[i] ($20 \leq i < 36$) to the centralized shared memory 160.

In this manner, in the third embodiment, as illustrated in FIG. 8A, the result of an arithmetic processing performed by the PE1 using a non-cacheable buffer is copied to the variable of the cache memory of the PE0. In other words, in a case where the plurality of processing elements access the data on the same line, one processing element (PE1) stores the data on the line in the non-cacheable area provided within the cache memory, while the other processing element (PE0) stores the data within the non-cacheable area in the centralized shared memory, and hence the plurality of processing elements do not write back the data to the same line. Therefore, the false sharing does not occur.

It should be noted that the data stored in the lines 811 to 814 is used only by the PE0, while the data stored in the lines 816 to 819 is used only by the PE1, and hence the lines 811 to 814 and the lines 816 to 819 may be localized on the cache memory. The localized data is retained on the cache memory before being used next by the PE0 or PE1 without being written back to the main memory. In the same manner, the data to be stored in the lines 811 to 814 and the data to be stored in the lines 816 to 819 may be stored in the local memory.

In other words, it is sufficient that only a fifth line 815 exists on the cache memory (cacheable area), and the other areas (lines 811 to 814 and lines 816 to 819) may not exist on the cacheable area.

It should be noted that, in this embodiment, the non-cacheable area needs to be provided on the memory, but the non-cacheable area may be provided on any one of the centralized shared memory, the distributed shared memory, and the like. Further, in this embodiment, the processing for copying the data from the non-cacheable area to the cache memory causes overhead. However, through use of the distributed shared memory as the non-cacheable buffer, data transfer can be realized with low overhead.

The method according to the third embodiment is effective in a case where the division or the expansion of the array cannot be performed by the above-mentioned, method according to the second embodiment.

Figure 8C:
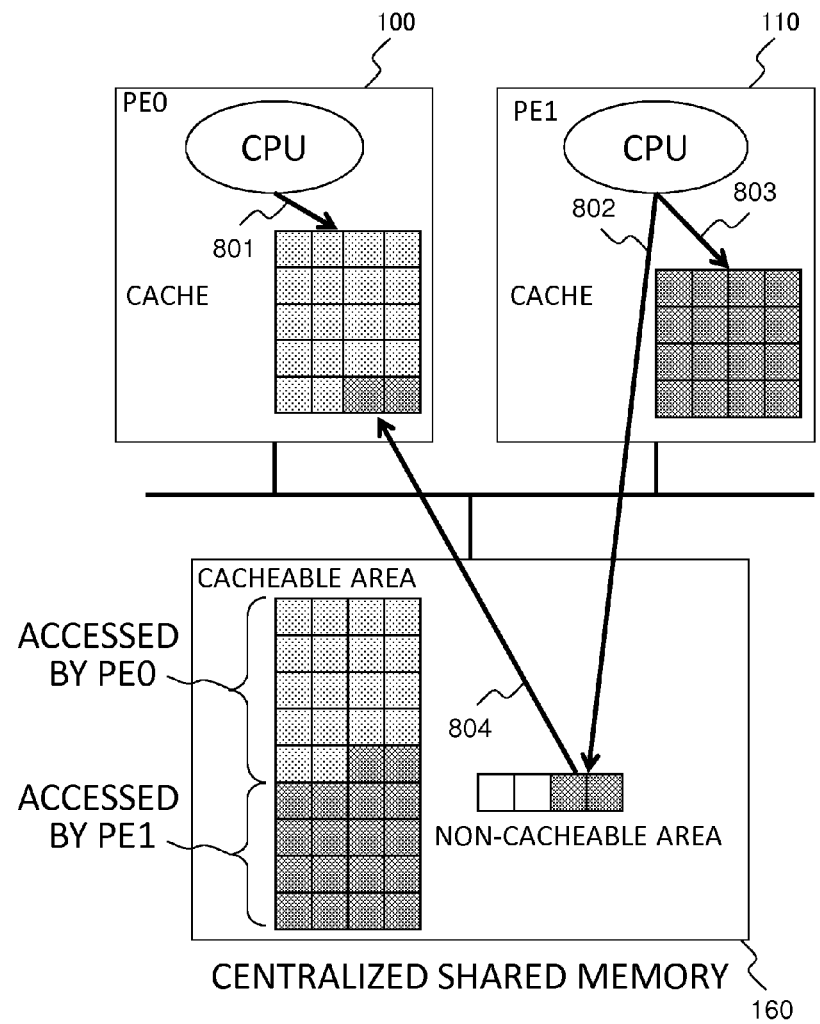
FIG. 8C is an explanatory diagram illustrating an example in which a non-cacheable area is provided to a centralized, shared memory according to the third embodiment of this invention.

FIG. 8C illustrates an example in which the non-cacheable area is provided to the centralized shared memory 160 according to the third embodiment of this invention. In the example illustrated in FIG. 8C, a partial area of the centralized shared memory 160 is designated as the non-cacheable area.

The PE0 processes the variable a[i] ($0 \leq i < 18$) on the cache memory (801), the processing element (PE1) 110 processes the variable a[i] (i=18, 19) on the non-cacheable area provided to the centralized shared memory 160 by using ncbuf[i] (i=2, 3) (802), and the PE1 processes the variable a[i] ($20 \leq i < 36$) on the cache memory (803).

After that, the variable ncbuf[i] (i=2, 3) processed by the PE1 is read from the non-cacheable area of the centralized shared memory 160, and written to the variable a[i] (i=18, 19) of the cache memory of the PE0 (804). With this operation, the variable a[i] (i=18, 19) processed by the PE1 is transferred to the PE0.

Therefore, even when the PE0 writes back the variable a[i] ($0 \leq i < 20$) to the centralized shared memory 160 and the PE1 writes back the variable a[i] ($20 \leq i < 36$) to the centralized shared memory 160, the false sharing does not occur.

Figure 8D:
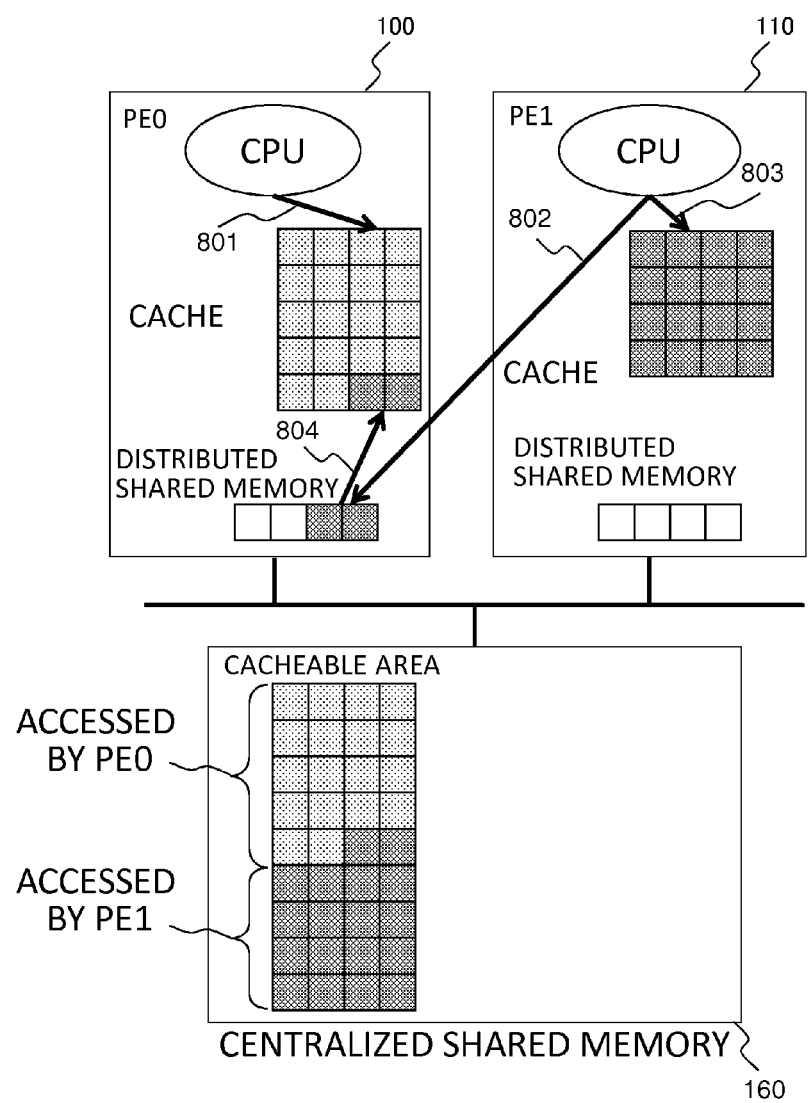
FIG. 8D is an explanatory diagram illustrating an example in which the non-cacheable area is provided to a distributed shared memory according to the third embodiment of this invention.

FIG. 8D illustrates an example in which the non-cacheable area is provided to the distributed shared memory 103 according to the third embodiment of this invention. In the example illustrated in FIG. 8D, a partial area of the distributed shared memory 103 is designated as the non-cacheable area.

The PE0 processes the variable a[i] ($0 \leq i < 18$) on the cache memory (801), the processing element (PE1) 110 processes the variable a[i] (i=18, 19) on the non-cacheable area provided to the distributed shared memory 103 of the PE0 by using ncbuf[i] (i=2, 3) (802), and the PE1 processes the variable a[i] ($20 \leq i < 36$) on the cache memory (803).

After that, the variable ncbuf[i] (i=2, 3) processed by the PE1 is read from the non-cacheable area of the distributed shared memory 103, and written to the variable a[i] (i=18, 19) of the cache memory of the PE0 (804). With this operation, the variable a[i] (i=18, 19) processed by the PE1 is transferred to the PE0.

Therefore, even when the PE0 writes back the variable a[i] ($0 \leq i < 20$) to the centralized shared memory 160 and the PE1 writes back the variable a[i] ($20 \leq i < 36$) to the centralized shared memory 160, the false sharing does not occur.

Figure 9A:
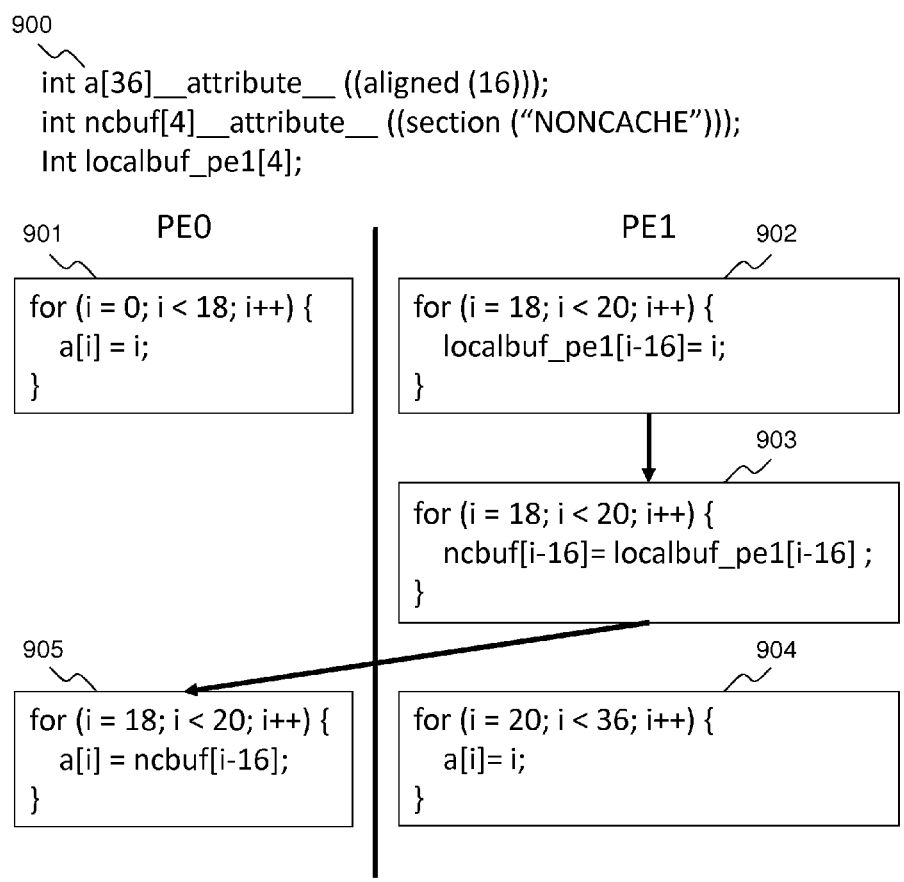
FIG. 9A is an explanatory diagram illustrating a modified example of a method of avoiding an occurrence of the false sharing according to the third embodiment of this invention.

FIG. 9A is an explanatory diagram illustrating a modified example of the method of avoiding the occurrence of the false sharing according to the third embodiment of this invention.

The modified example to be described with reference to FIG. 9A is different from the above-mentioned example in that in the modified example, the respective processing elements perform the arithmetic processing their own memories, and transfer arithmetic processing results thereof to the non-cacheable area, thereby avoiding the occurrence of the false sharing. Therefore, it is possible to reduce access to the other memory, the processing element, or the like, and to speed up the processing.

First, as illustrated in FIG. 9A, the global variable a, the variable ncbuf, and a variable localbuf_pe1 are declared, and the variable a is placed at the head of the line of the centralized shared memory (head of the line of the cache memory). Further, the variable ncbuf having the size of four elements of the array variable is provided to the non-cacheable area, and the variable localbuf_pe1 having the size of four elements of the array variable is provided to the non-cacheable area (900). It should be noted that the variable localbuf_pe1 is used only by the processing element (PE1) 110, and may therefore be a local variable.

After that, the processing element (PE0) 100 processes the variable a[i] (0≤i<18) on the cache memory (901), and the PE1 processes the variable a[i] (i=18, 19) by using localbuf_pe1[i] (i=2, 3) (902), and writes the results of the processing (localbuf_pe1[i] (i=2, 3)) to ncbuf[i] (i=2, 3) (903). After that, the PE1 processes the variable a[i] (20≤i<36) on the cache memory (904).

After that or in parallel with the processing 904, the PE0 reads the variable ncbuf[i] (i=2, 3) processed by the PE1 from the non-cacheable area, and writes the variable ncbuf[i] (i=2, 3) to the variable a[i] (i=18, 19) of the cache memory of the PE0 (905). By the above-mentioned data dependence, the variable a[i] (i=18, 19) processed by the PE1 is transferred to the PE0.

After that, the PE0 writes back the variable a[i] (0≤i<20) to the centralized shared memory 160, and the PE1 writes back the variable a[i] (20≤i<36) to the centralized shared memory 160.

Figure 9B:
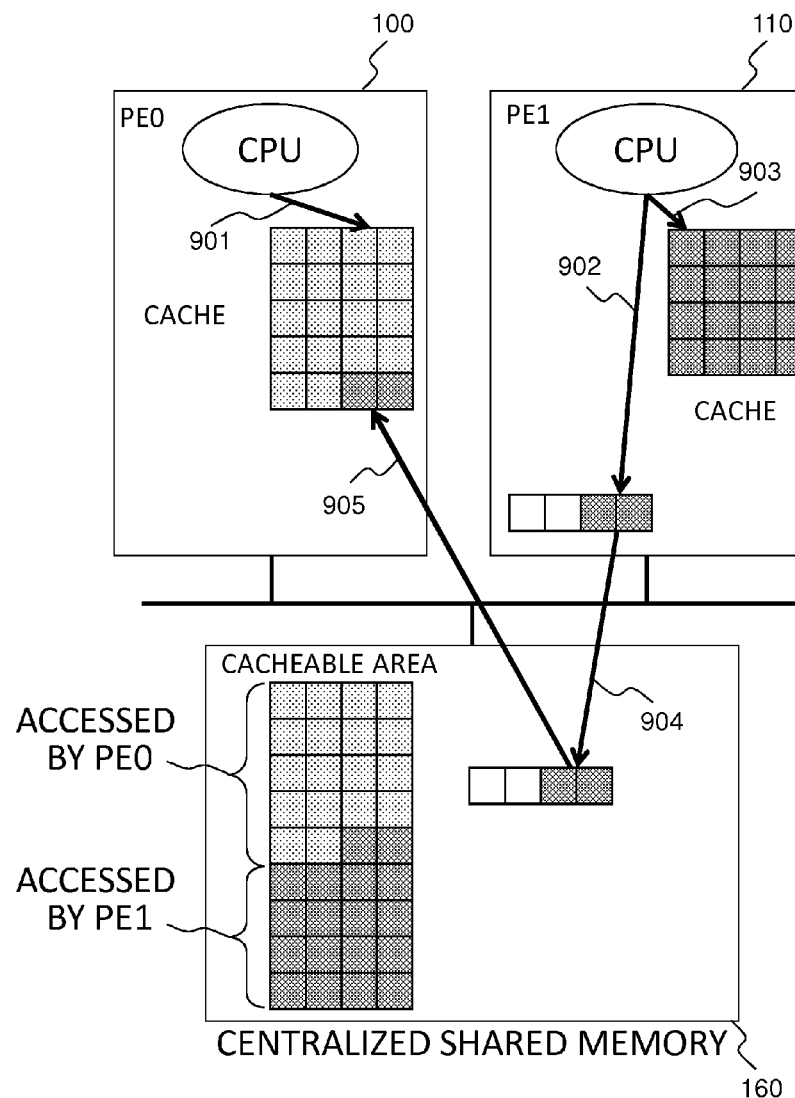
FIG. 9B is an explanatory diagram illustrating an example in which the non-cacheable area is provided to a centralized shared memory according to the modified example shown in FIG. 9A.

FIG. 9B illustrates an example in which the non-cacheable area is provided to the centralized shared memory 160 and an arithmetic processing area (localbuf_pe1) is provided to the memory of the PE1 according to the third embodiment of this invention. The memory of the PE1 to which the arithmetic processing area is provided may be any one of the local memory, the distributed shared memory, and the cache memory.

The PE0 processes the variable a[i] (0≤i<18) on the cache memory (901), and the PE1 processes the variable a[i] (i=18, 19) by using localbuf_pe1[i] (i=2, 3) provided on the memory of the PE1 (902), and writes the results of the processing (localbuf_pe1[i] (i=2, 3)) to ncbuf[i] (i=2, 3) on the non-cacheable area provided to the centralized shared memory 160 (903). After that, the PE1 processes the variable a[i] (20≤i<36) on the cache memory (904).

After that, the variable ncbuf[i] (i=2, 3) processed by the PE1 is read from the non-cacheable area of the centralized shared memory 160, and written to the variable a[i] (i=18, 19) of the cache memory of the PE0 (905). With this operation, the variable a[i] (i=18, 19) processed by the PE1 is transferred to the PE0.

Therefore, even when the PE0 writes back the variable a[i] (0≤i<20) to the centralized shared memory 160 and the PE1 writes back the variable a[i] (20≤i<36) to the centralized shared memory 160, the false sharing does not occur.

Figure 9C:
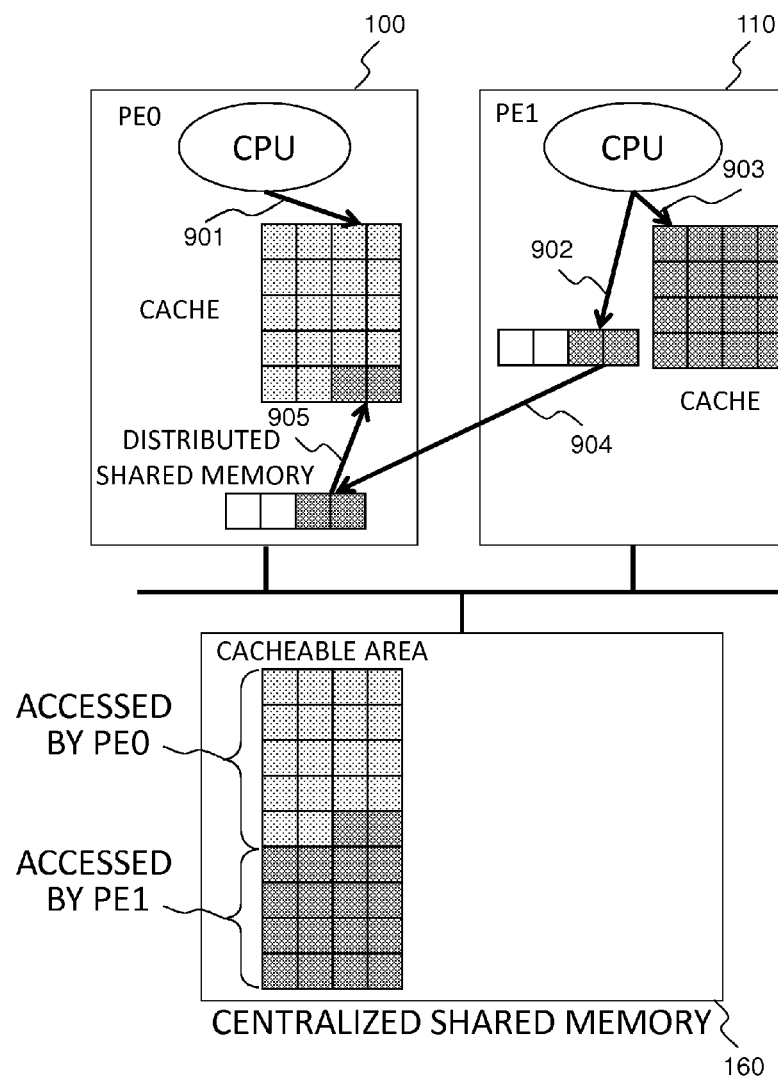
FIG. 9C is an explanatory diagram illustrating an example in which the non-cacheable area is provided to a distributed shared memory according to the modified example shown in FIG. 9A.

FIG. 9C illustrates an example in which the non-cacheable area is provided to the distributed shared memory 103 and the arithmetic processing area (localbuf_pe1) is provided to the memory of the PE1 according to the third embodiment of this invention. In the example of FIG. 9C, a partial area of the distributed shared memory 103 is designated as the non-cacheable area. Further, the memory of the PE1 to which the arithmetic processing area is provided may be any one of the local memory, the distributed shared memory, and the cache memory.

The PE0 processes the variable a[i] (0≤i<18) on the cache memory (901), and the PE1 processes the variable a[i] (i=18, 19) by using localbuf_pe1[i] (i=2, 3) provided on the memory of the PE1 (902), and writes the results of the processing (localbuf_pe1[i] (i=2, 3)) to ncbuf[i] (i=2, 3) on the non-cacheable area provided to the distributed shared memory 103 of the PE0 (903). After that, the PE1 processes the variable a[i] (20≤i<36) on the cache memory (904).

After that, the variable ncbuf[i] (i=2, 3) processed by the PE1 is read from the non-cacheable area of the distributed shared memory 103, and written to the variable a[i] (i=18, 19) of the cache memory of the PE0 (905). With this operation, the variable a[i] (i=18, 19) processed by the PE1 is transferred to the PE0.

Therefore, even when the PE0 writes back the variable a[i] (0≤i<20) to the centralized shared memory 160 and the PE1 writes back the variable a[i] (20≤i<36) to the centralized shared memory 160, the false sharing does not occur.

According to the modified example described with reference to FIGS. 9A to 9C, the variable in a boundary portion is processed using the arithmetic processing in the memory on the own processing element, and hence it is possible to reduce the transfer of the data to the other processing element or the memory via the bus is reduced, and to speed up the processing.

Figure 10A:
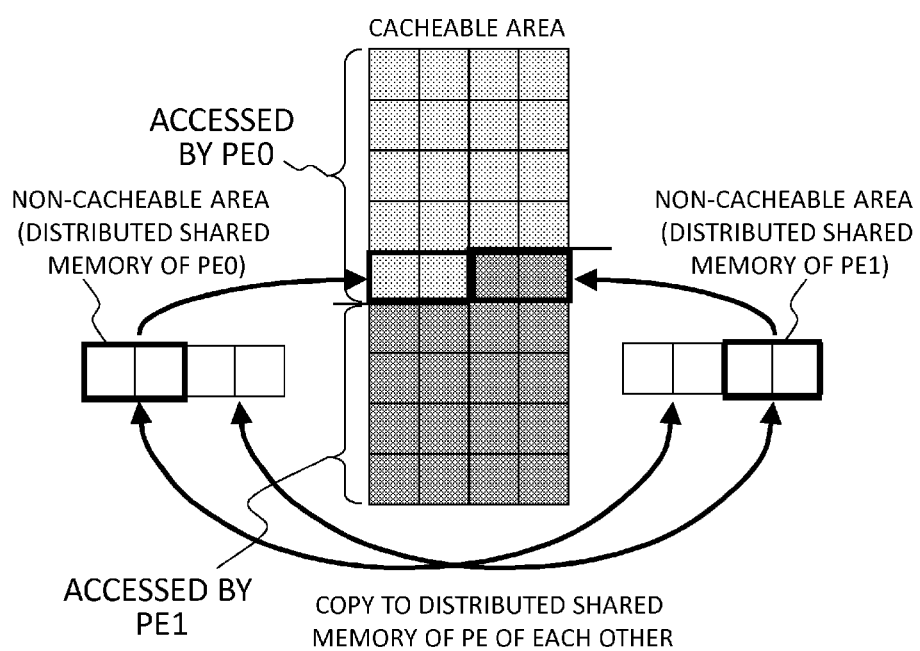
FIG. 10A is an explanatory diagram illustrating another modified example of a method of avoiding the occurrence of the false sharing according to the third embodiment of this invention.
Figure 10B:
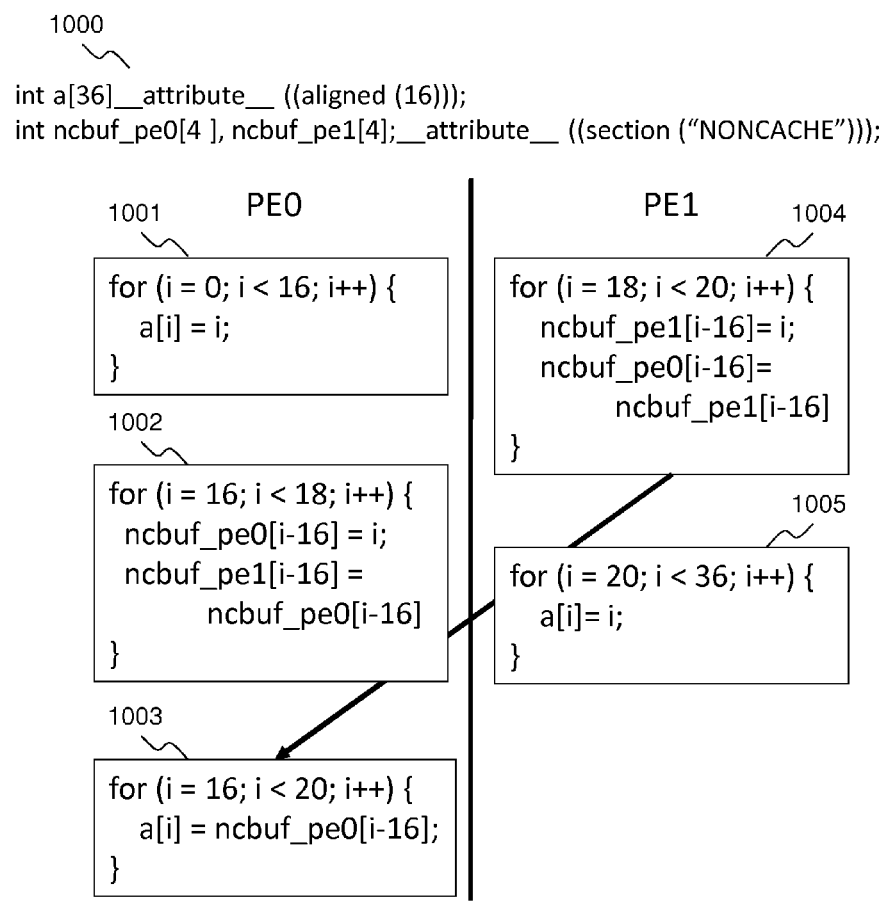
FIG. 10B is an explanatory diagram illustrating another modified example of the method of avoiding the occurrence of the false sharing according to the third embodiment of this invention.

FIGS. 10A and 10B are explanatory diagrams illustrating another modified example of the method of avoiding the occurrence of the false sharing according to the third embodiment of this invention.

First, as illustrated in FIG. 10B, the global variables a, ncbuf_pe0, and ncbuf_pe1 are declared, the variable a is placed at the head of the line of the centralized shared memory (head of the line of the cache memory), and the variable ncbuf_pe0 and the variable ncbuf_pe1 each having the size of four elements of the array variable are provided to the non-cacheable area (1000). The variable ncbuf_pe0 is placed in the distributed shared memory of the PE0, and the variable ncbuf_pe1 is placed in the distributed shared memory of the PE1.

In this embodiment, the processing element (PE0) 100 processes the variable a with i=0 to i=17, and the processing element (PE1) 110 processes the variable a with i=18 to i=35.

Specifically, the processing element (PE0) 100 processes the variable a[i] (0≤i<16) on the cache memory (1001). Further, the PE0 processes the variable a[i] (i=16, 17) in ncbuf_pe0 on the distributed shared memory, and writes the results of the processing to ncbuf_pe1 in the distributed shared memory of the PE1 (1002).

In parallel therewith or before or after that, the processing element (PE1) 110 processes the variable a[i] (i=18, 19) in ncbuf_pe1 on the distributed shared memory, and writes the results of the processing to ncbuf_pe0 in the distributed shared memory of the PE0 (1004). Further, the PE1 processes the variable a[i] (20≤i<36) on the cache memory (1005).

Further, the PE0 reads the variable ncbuf_pe0[i] (0≤i<4) from the non-cacheable area, and writes the variable ncbuf_pe0[i] to the variable a[i] (16≤i<20) in the cache memory of the PE0 (1003). It should be noted that, due to the data dependence from the writing of the results of the processing to ncbuf_pe0 (1004) onto the writing of ncbuf_pe0 to a[i] (1003), the variable a[i] (i=18, 19) processed by the PE1 is stored in ncbuf_pe0[i]. Therefore, in Step 1003, the variable a[i] (i=16, 17) processed by the PE0 and the variable a[i] (i=18, 19) processed by the PE1 are written to the cache memory of the PE0.

After that, the PE0 and the PE1 write back the results of the processing to the centralized shared memory 160. However, unlike the case described above with reference to FIG. 5A, the same data is stored in the variable a[i] (16≤i<20) in a boundary area between the PE0 and the PE1, and hence the data stored in the centralized shared memory 160 is not changed no matter which processing element writes back the data.

In other words, in the third embodiment, the respective processing elements use the data on the distributed shared memory to perform calculation on the boundary portion between the area of the centralized shared memory accessed by the PE0 and the area of the centralized shared memory accessed by the PE1.

It should be noted that ncbuf_pe0 of the PE0 and ncbuf_pe1 of the PE1 are written to data of each other, and hence the same value is stored therein. Therefore, when the PE0 writes the variable ncbuf_pe0 to the centralized shared memory, i=2, 3 of the variable ncbuf_pe1 is also written to the centralized shared memory, and by having any one of ncbuf_pe0 and ncbuf_pe1 written to the centralized shared memory, the other one of the data pieces is also written to the centralized shared memory.

In this manner, in the third embodiment, as illustrated in FIG. 10A, in the case where the plurality of processing elements access the data on the same line, the data on the line is stored in the non-cacheable areas provided within the distributed shared memories of both the processing elements, and by copying the data pieces within both the non-cacheable areas, the data pieces within both the non-cacheable areas match. Therefore, no matter which data is written back, the false sharing does not occur.

It should be noted that, in this embodiment, the non-cacheable area needs to be provided on the distributed shared memory, the processing for copying data between the distributed shared memories causes the overhead.

Figure 11:
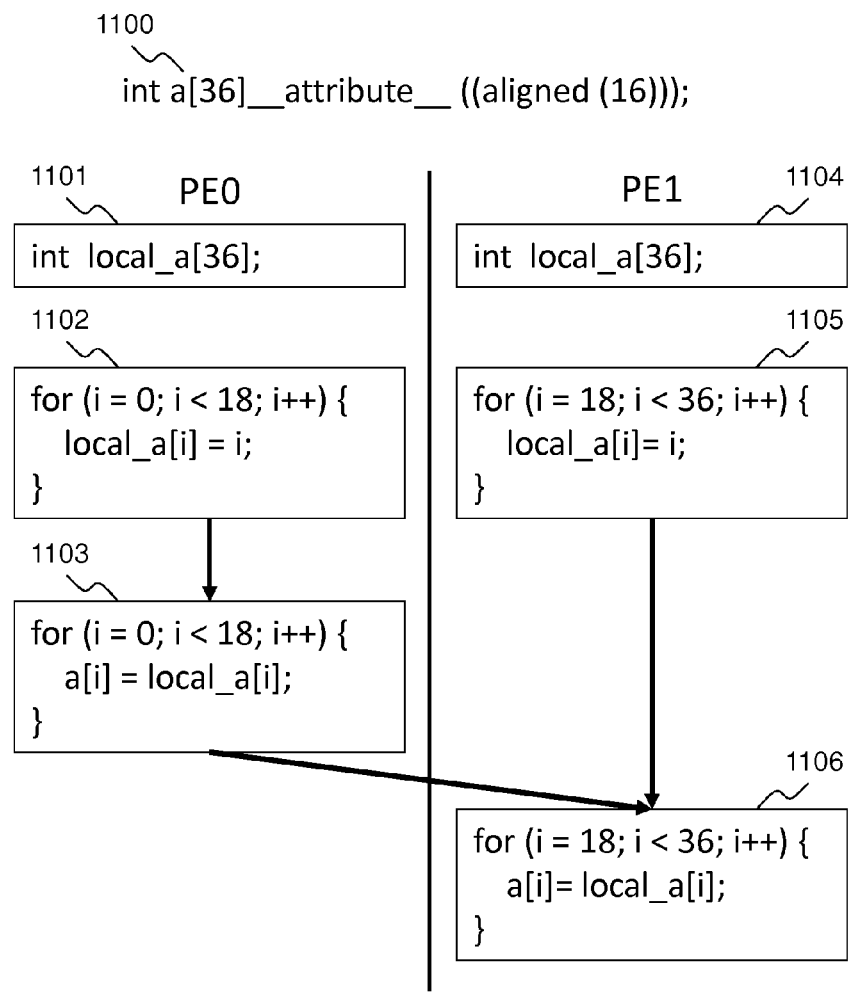
FIG. 11 is an explanatory diagram illustrating a method of avoiding an occurrence of the false sharing according to a fourth embodiment of this invention.

FIG. 11 is an explanatory diagram illustrating the method of avoiding the occurrence of the false sharing according to a fourth embodiment of this invention.

In the fourth embodiment, the local variable is used, to thereby avoid the occurrence of the false sharing.

First, as illustrated in FIG. 11, the global variable a is declared, and the variable a is placed at the head of the line of the centralized shared memory (head of the line of the cache memory) (1100).

After that, the processing element (PE0) 100 declares the local variable local_a (1101), processes the variable a[i] (0≤i<18) in the local variable (1102), and writes the local variable local_a[i] (0≤i<18) to the global variable a[i] (0≤i<18) (1103).

In parallel therewith or before or after that, the processing element (PE1) 110 declares the local variable local_a (1104), processes the variable a[i] (18≤i<36) in the local variable (1105), and writes the local variable local_a[i] (18≤i<36) with i=18 to i=35 to the global variable a[i] (18≤i<36) (1106).

In Step 1106, the data dependence from Step 1103 is set, and hence before local_a[i] is written to a[i] in Step 1106, a[i] (i=16, 17) is loaded from the centralized shared memory 160. Therefore, in Step 1106, a[16] and a[17] updated by the PE0 are written back to the centralized shared memory along with a[18] and a[19].

In this manner, in the fourth embodiment, as illustrated in FIG. 11, the plurality of processing elements use the local variable to update the data, and the respective processing elements write back the local variable to a global variable. Therefore, in the fourth embodiment, the false sharing does not occur.

It should be noted that, in this embodiment, the processing for copying data between the processing elements causes the overhead.

Next, a case of handling a multi-dimensional array is described.

Figure 12A:
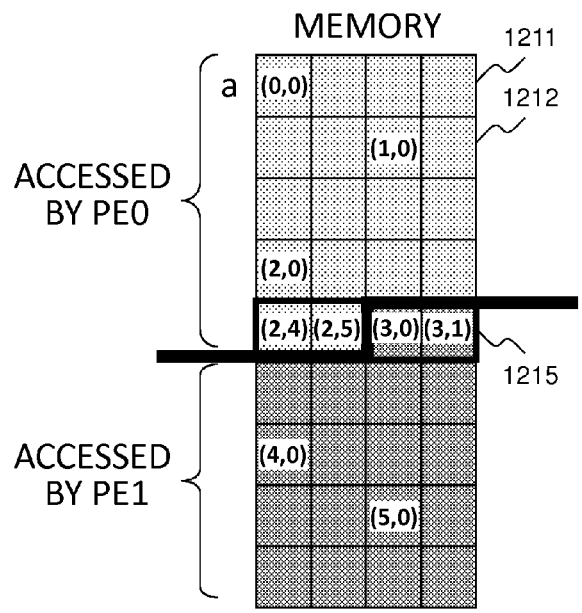
FIG. 12A is an explanatory diagrams illustrating an example in which the false sharing occurs between elements of an array variable in the case of handling the multi-dimensional array.
Figure 12B:
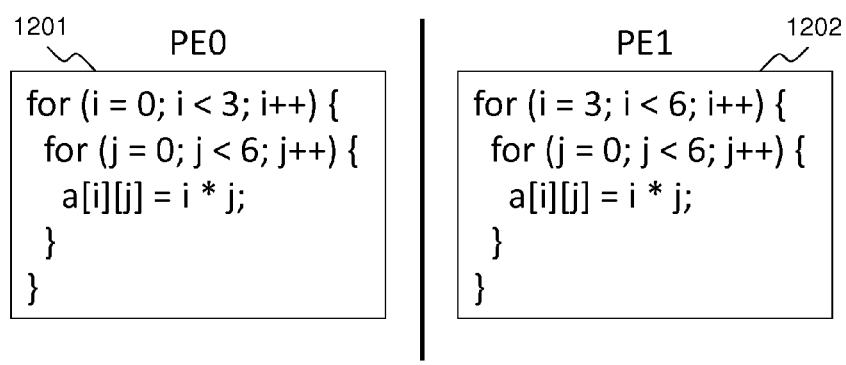
FIG. 12B is an explanatory diagrams illustrating an example in which the false sharing occurs between the elements of the array variable in the case of handling the multi-dimensional array.

FIGS. 12A and 12B are explanatory diagrams illustrating an example in which the false sharing occurs between the elements of the array variable in the case of handling the multi-dimensional array.

First, as illustrated in FIG. 12B, the global variable a of a 6×6 two-dimensional array is declared, and the variable a is placed at the head of the line of the centralized shared memory (head of the line of the cache memory) (1200). Four variables can be stored in one line of the cache memory. Therefore, as illustrated in FIG. 12A, a[0][0] to a[0][3] exist in a first line 1211 of the cache memory, a[0][4] to a[1][1] exist in a second line 1212, and a[2][4], a[2][5], a[3][0], and a[3][1] exist in a fifth line 1215.

After that, the processing element (PE0) 100 processes the variable a[i][j] (0≤i<3, 0≤j<6) on the cache memory 102 (1201), the processing element (PE1) 110 processes the variable a[i][j] (3≤i<6, 0≤j<6) on the cache memory 112 (1202), and the PE0 and the PE1 write back the results of the processing from the cache memories 102 and 112 to the centralized shared memory 160.

Writeback of the data from the cache memories 102 and 112 to the centralized shared memory 160 is performed in the units of lines. Further, as described above, if a loop can be divided by the boundary of the cache line, the false sharing does not occur. However, based on the fact that a[2][4] and a[2][5], processed by the PE0, and a[3][0] and a[3][1], processed by the PE1, exist on the fifth line 1215, a conflict occurs between the access by the PE0 and the access by the PE1 on the line, resulting in false sharing occurring.

Figure 13A:
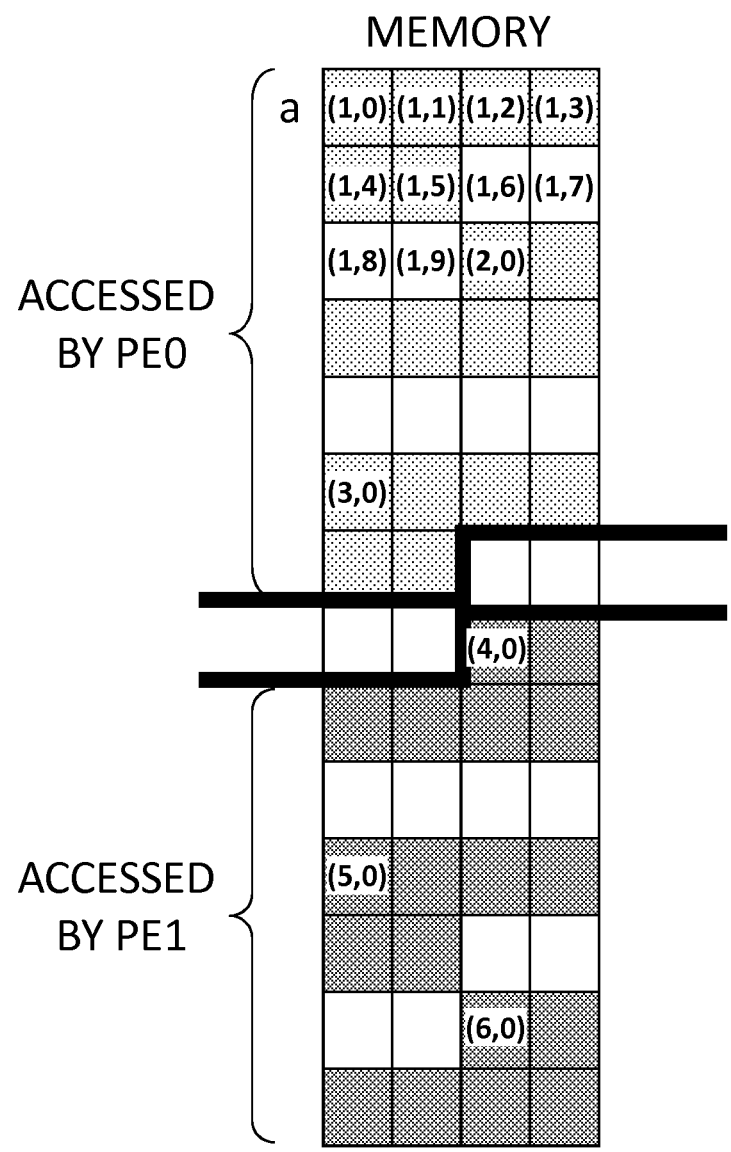
FIG. 13A is an explanatory diagram illustrating an example of applying the first embodiment to a two-dimensional array variable.
Figure 13B:
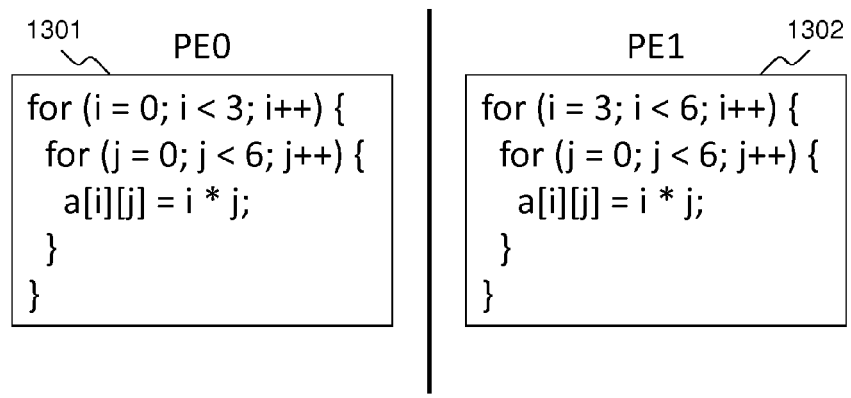
FIG. 13B is an explanatory diagram illustrating the example of applying the first embodiment to a two-dimensional array variable.

FIGS. 13A and 13B are explanatory diagrams illustrating an example of applying the first embodiment to a two-dimensional array variable.

In the first embodiment, in order to divide the loop by the boundary of the cache line, the respective elements of the array variable are placed in different lines for each parameter of an outer loop.

First, as illustrated in FIG. 13B, the global variable a of a 6×10 two-dimensional array is declared, and the variable a is placed at the head of the line of the centralized shared memory (head of the line of the cache memory) (1300). The respective variables a[i][j] of this array are placed in different lines for each parameter of the outer loop.

In this embodiment, four variables can be stored in one line of the cache memory, and the necessary variable is the 6×6 array. Therefore, extra variables, having a line size (of four), are provided, and the 6×10 array variable are defined.

It should be noted that the extra variables only need to be provided with a line size of −1.

In addition, the smallest value of the number of extra array variables is given by the smallest value of S obtained when the following expression is equal to or larger than zero.

(smallest value of number of extra array variables)=
(multiple of $S(4)$)−$j$max S: line size jmax: number (6) of second outer loops of the array variable After that, the processing element (PE0) 100 processes the variable a[i][j] (0≤i<3, 0≤j<6) on the cache memory 102 (1301), the processing element (PE1) 110 processes the variable a[i][j] (3≤i<6, 0≤j<6) on the cache memory 112 (1302), and the PE0 and the PE1 write back the results of the processing from the cache memories 102 and 112 to the centralized shared memory 160.

The writeback of the data from the cache memories 102 and 112 to the centralized shared memory 160 is performed by each line. However, unlike the case described above with reference to FIG. 12, as illustrated in FIG. 13B, the PE0 and the PE1 do not access the same line of the cache memory. Therefore, the plurality of processing elements do not write back the data to the same line, and the false sharing does not occur.

It should be noted that, in this embodiment, the extra variables are reserved, which deteriorates the use efficiency of the cache memory. Therefore, this embodiment is effective in the case where the number of elements of the array variable is small.

Figure 14A:
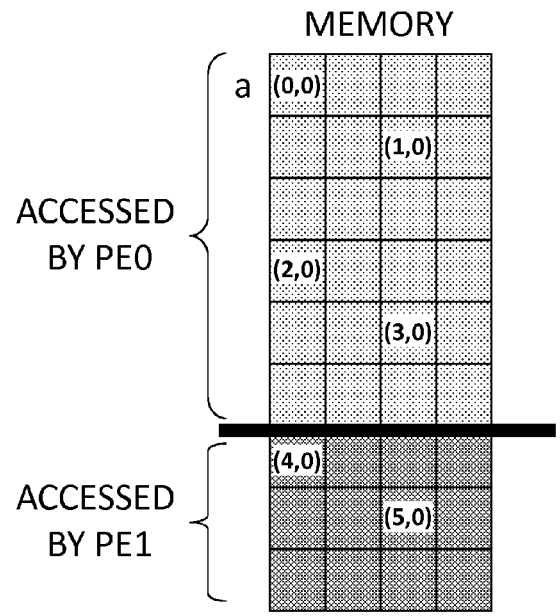
FIG. 14A is an explanatory diagram illustrating an example of applying the second embodiment to a two-dimensional array variable.
Figure 14B:
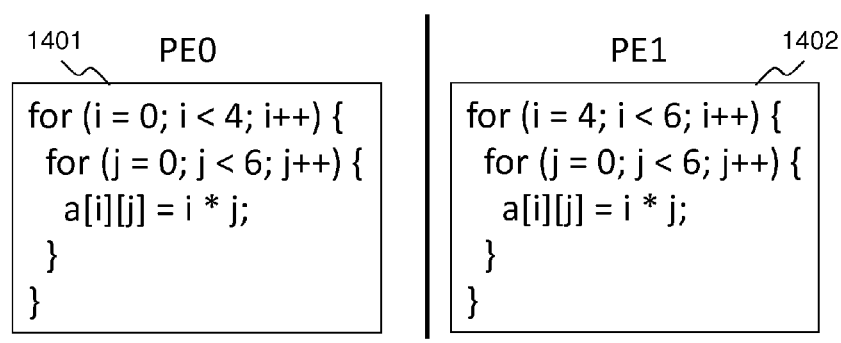
FIG. 14B is an explanatory diagram illustrating the example of applying the second embodiment to the two-dimensional array variable.

FIGS. 14A and 14B are explanatory diagrams illustrating an example of applying the second embodiment to a two-dimensional array variable.

In the second embodiment, the respective processing elements divide the data to be processed by a delimiter of the line of the cache memory, and prevent the data processed by the plurality of processing elements from being stored on one line of the cache memory.

First, as illustrated in FIG. 14B, the global variable a of a 6×10 two-dimensional array is declared, and the variable a is placed at the head of the line of the centralized shared memory (head of the line of the cache memory) (1400).

After that, the processing element (PE0) 100 processes the variable a[i][j] (0≤i<4, 0≤j<6) on the cache memory 102 (1401), and the processing element (PE1) 110 processes the variable a[i][j] (4≤i<6, 0≤j<6) on the cache memory 112 (1402).

After that, the PE0 writes back the results of the processing from the cache memory 102 to the centralized shared memory 160, and the PE1 writes back the results of the processing from the cache memory 112 to the centralized shared memory 160.

In this embodiment, as illustrated in FIG. 14A, one line has the capacity that can store four variables, but a[3][6] and a[4][0] exist on the different lines. Therefore, the plurality of processing elements do not write back the data to the same line, and the false sharing does not occur.

It should be noted that, in this embodiment, the processing using twenty-four and twelve elements of the array variable is allocated to the PE0 and the PE1, respectively, but the processing using twelve and twenty-four elements of the array variable may be allocated to the PE0 and the PE1, respectively, as long as the elements are divided into a multiple of the cache line size. Further, the processing using the elements of the array variable, the number of which is based on the ratio of processing performance of the respective processing elements, may be allocated.

It should be noted that, in this embodiment, loop division is possible if the size of the elements of the array variable is equal to or smaller than a subject dimension and is a multiple of the line size. In this case, the allocated numbers of elements of the array variable may not be equal to each other depending on the number of elements of the array variable and the number of the processing elements, and an imbalance may occur in the processing load on the processing element. Therefore, this embodiment is effective in the case where the array size is sufficiently large and the imbalance is small enough to be ignored compared to the array size.

Figure 15A:
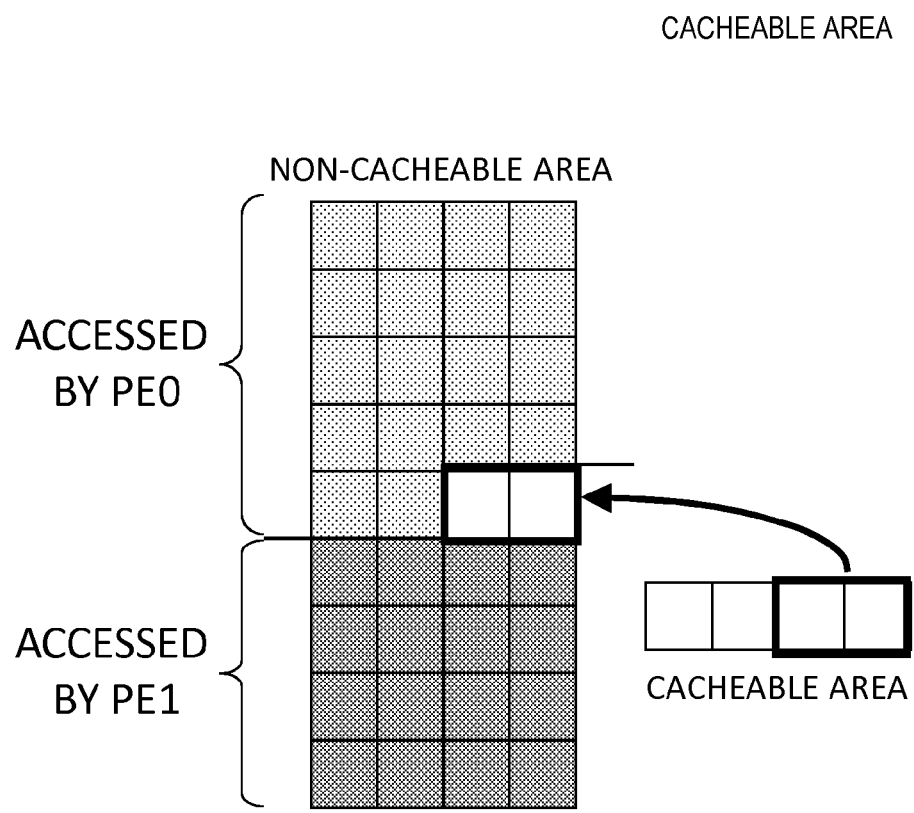
FIG. 15A is an explanatory diagram illustrating an example of applying the third embodiment to a two-dimensional array variable.
Figure 15B:
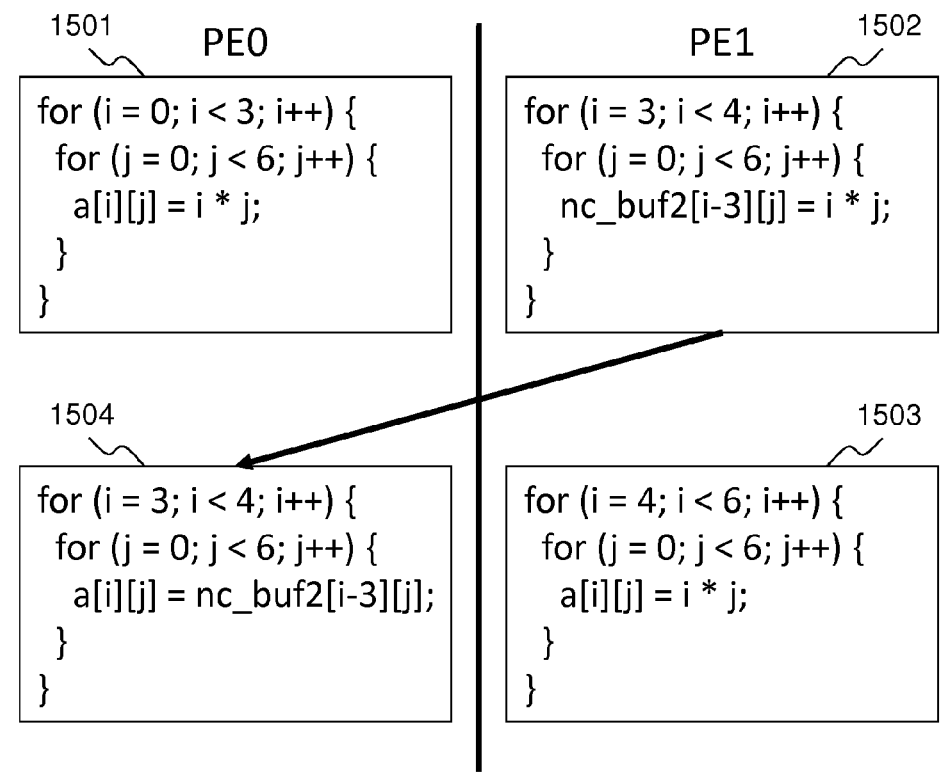
FIG. 15B is an explanatory diagram illustrating the example of applying the third embodiment to the two-dimensional array variable.

FIGS. 15A and 15B are explanatory diagrams illustrating an example of applying the third embodiment to a two-dimensional array variable.

In the third embodiment, the non-cacheable area is used to avoid the occurrence of the false sharing.

First, as illustrated in FIG. 15B, the global variable a of a 6×6 two-dimensional array is declared, and the variable a is placed at the head of the line of the centralized shared memory (head of the line of the cache memory). Further, a 1×6 one-dimensional array variable nc_buf2 is declared, and the non-cacheable area in which the variable nc_buf2 has a size of six variables (number of inner loops) is provided (1500).

After that, the processing element (PE0) 100 processes the variable a[i][j] (0≤i≤3, 0≤j<6) on the cache memory (1501), the processing element (PE1) 110 processes the variable a[3][j] (0≤i<6) on the non-cacheable area by using nc_buf2[0][j] (0≤j<6) (1502), and the PE1 processes the variable a[i][j] (4≤i<6, 0≤j<6) on the cache memory (1503).

After that or in parallel with the processing 1503, the PE0 reads the variable nc_buf2[0][j] (0≤j<6) processed by the PE1 from the non-cacheable area, and writes the variable nc_buf2[0][j] (0≤j<6) to the variable a[3][j] (0≤j<6) of the cache memory of the PE0 (1504). With this operation, the variable a[3][j] (0≤j<6) processed by the PE1 by using nc_buf2[0][j] (0≤j<6) is transferred to the PE0.

After that, the PE0 writes back the variable a[i][j] (0≤i<4, 0≤j<6) to the centralized shared memory 160, and the PE1 writes back the variable a[i][j] (4≤i≤6, 0≤j<6) to the centralized shared memory 160.

In this manner, in the third embodiment, as illustrated in FIG. 15A, the result of the arithmetic processing performed by the PE1 using the non-cacheable buffer is copied to the variable of the cache memory of the PE0. In other words, in the case where the plurality of processing elements access the data on the same line, one processing element (PE1) stores the data on the line in the non-cacheable area, while the other processing element (PE0) stores the data within the non-cacheable area in the cacheable area of the centralized shared memory, and hence the plurality of processing elements do not write back the data to the same line, and hence the false sharing does not occur.

It should be noted that, in this embodiment, the non-cacheable area needs to be provided on the memory, but the non-cacheable area may be provided to the memory of any one of the centralized shared memory, the distributed shared memory, and the like. Further, in this embodiment, the processing for copying data from the non-cacheable area to the cache memory causes the overhead. However, through use of the distributed shared memory as the non-cacheable buffer, the data transfer can be realized with low overhead.

Figure 16:
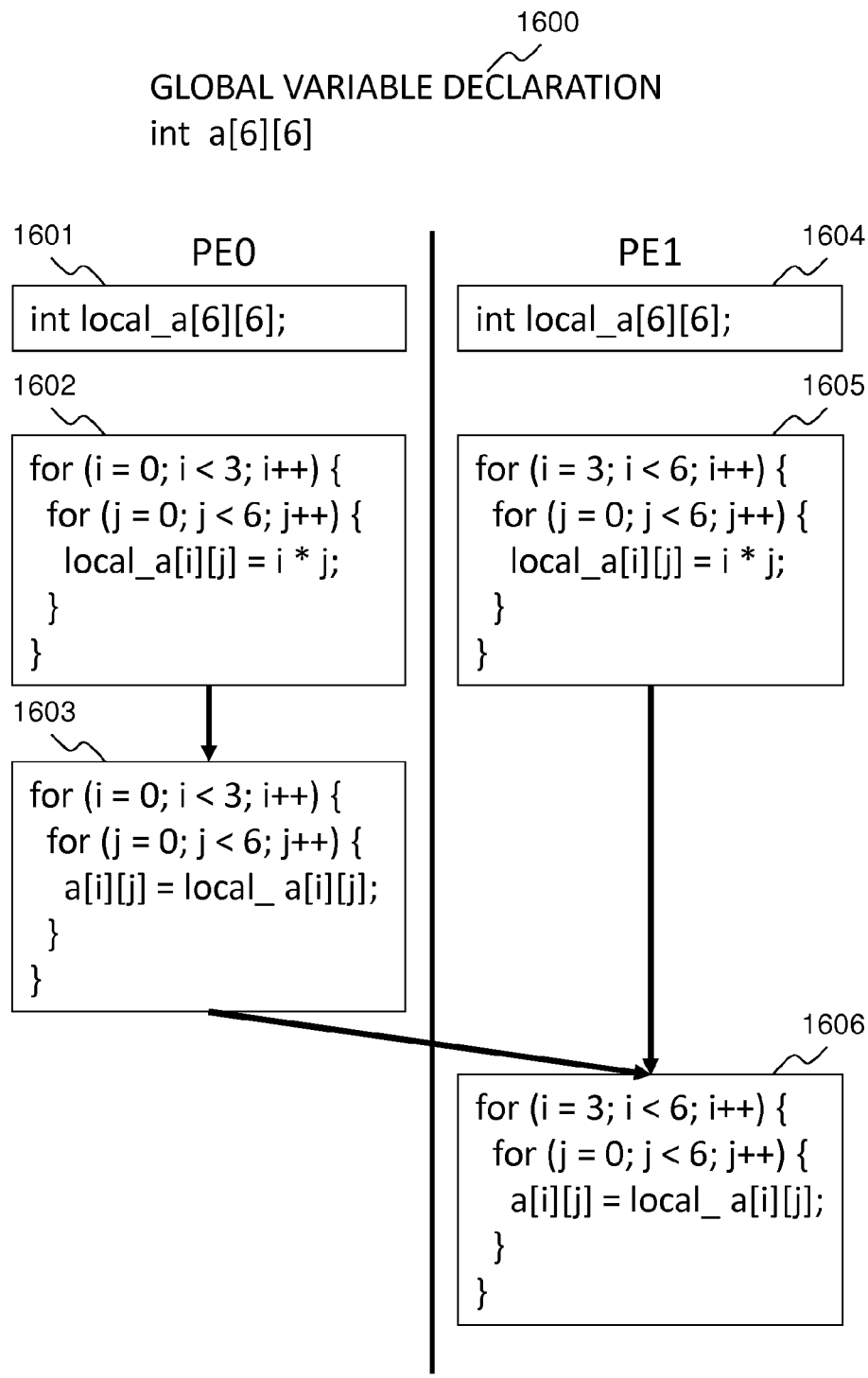
FIG. 16 is an explanatory diagram illustrating an example of applying the fourth embodiment to a two-dimensional array variable.

FIG. 16 is an explanatory diagram illustrating an example of applying the fourth embodiment to a two-dimensional array variable.

First, as illustrated in FIG. 16, the global variable a of a 6×6 two-dimensional array is declared, and the variable a is placed at the head of the line of the centralized shared memory (head of the line of the cache memory) (1600).

After that, the processing element (PE0) 100 declares the local variable local_a of the 6×6 two-dimensional array (1601), processes the variable a[i][j] (0≤i<3, 0≤j<6) by using the local variable local_a[i][j] (1602), and writes the local variable local_a[i][j] (0≤i<3, 0≤j<6) to the global variable a[i][j] (0≤i<3, 0≤j<6) (1603).

In parallel therewith or before or after that, the processing element (PE1) 110 declares the local variable local_a of the 6×6 two-dimensional array (1604), processes the variable a[i][j] (3≤i<6, 0≤j<6) by using the local variable local_a[i][j] (1605), and writes the local variable local_a[i][j] (3≤i<6, 0≤j<6) to the global variable a[i][j] (3≤i<6, 0≤j<6) (1606).

In Step 1606, the data dependence from Step 1603 is set, and hence before local_a[i][j] is written to a[i][j] in Step 1606, a[2][4] and a[2][5] are loaded from the centralized, shared memory 160. Therefore, in Step 1606, a[2][4] and a[2][5] updated by the PE0 are written back to the centralized shared memory along with a[3][0] and a[3][1].

In this manner, in the fourth embodiment, as illustrated in FIG. 16, the plurality of processing elements use the local variable to update the data, and the respective processing elements write back the local variable to the global variable. Therefore, in the fourth embodiment, the false sharing does not occur.

It should be noted that, in this embodiment, the processing for copying data between the processing elements causes the overhead.

The embodiments and the modified examples that are described above can be used by selecting one therefrom or combining a plurality thereof when the program is compiled.

Next, a procedure for selecting a method optimal for the compiler to avoid the false sharing is described.

Figure 17A:
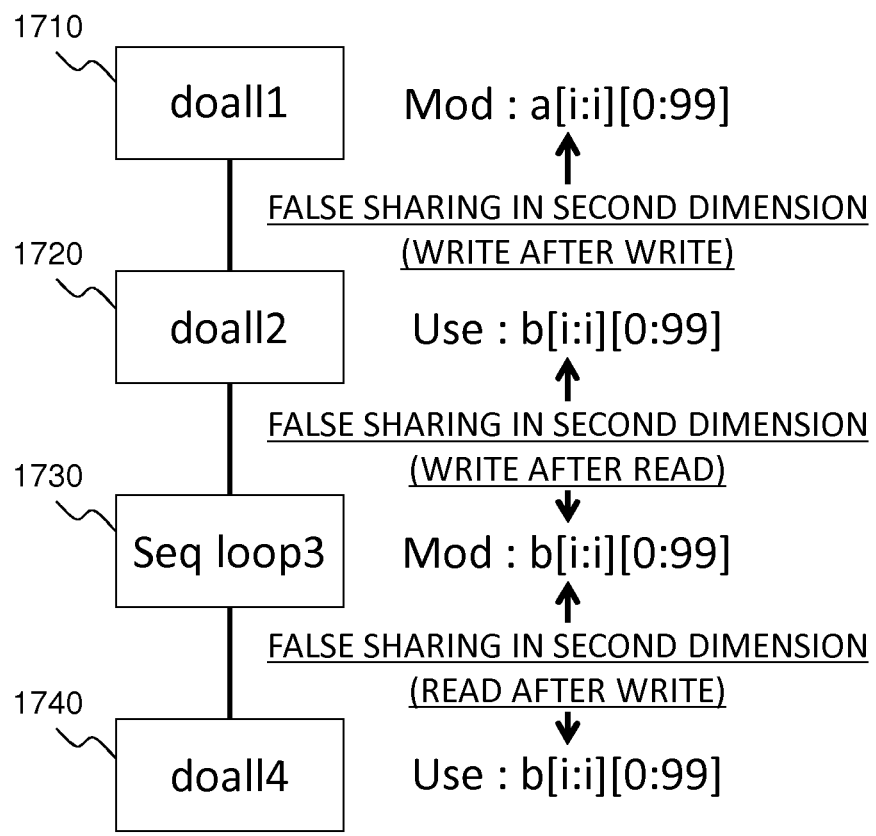
FIG. 17A is a macro-task graph illustrating processing performed before the loop division, according to the embodiments of this invention.

FIG. 17A is a macro-task graph illustrating processing performed before the loop division according to the embodiments of this invention.

In Step 1710, which is a loop with the variable i set as a control variable, parallel processing is performed by scheduling partial tasks generated by the loop division to mutually different processing elements. In the respective partial tasks generated in a case of subjecting the tasks to the loop division by a maximum division number, in other words, when tasks are subject to the loop division so as to assume processing for one iteration of an i-loop as one partial task, it is analyzed by a data access range analysis that 0 to 99 elements in the first dimension and i to i elements in the second dimension are likely to be changed with regard to a two-dimensional array variable A. In the same manner, it is analyzed that in Step 1720, the 0 to 99 elements in the first dimension and the i to i elements in the second dimension are likely to be used with regard to a two-dimensional array variable B, that in Step 1730, the 0 to 99 elements in the first dimension and the i to i elements in the second dimension are likely to be changed with regard to the two-dimensional array variable B, and that in Step 1750, the 0 to 99 elements in the first dimension and the i to i elements in the second dimension are likely to be changed with regard to the two-dimensional array variable B. Here, the access range in the case of subjecting the respective tasks to the loop division by the maximum division number is taken into consideration in order to analyze whether or not the false sharing is likely to occur in a case where task division is performed by an arbitrary division pattern.

Analyzed from the access range of data in the respective partial tasks of the respective tasks are a portion that is likely to cause the false sharing, the array variable being a factor thereof, and an array dimension thereof. Specifically, it can be determined that the false sharing is likely to occur in a case where, in a data access range of the above-mentioned partial task, in the lowest dimension among dimensions including a loop control variable in a division source task, a residual occurs when a partial array size of the lowest dimension is divided by the line size of the cache memory. In that case, the false sharing is likely to occur between the respective partial tasks obtained after dividing the task for updating the array or between the respective partial tasks obtained after dividing the task for updating the array and the respective partial tasks obtained after dividing the task that uses the array.

It should be noted that a method of storing the variable in the memory differs depending on a program language, and hence a subscript to be set as the first dimension differs depending on the method of storing the variable in the memory.

In other words, in a case where the subscript changed depending on the element of the array variable stored in a continuous area of the memory and the subscript that forms an innermost loop are different, the compiler may perform an interchange for changing a calculation sequence as necessary.

Further, in a case where the array variable is not aligned at the head of the line of the centralized shared memory 160, it is analyzed that the false sharing is likely to occur irrespective of the above-mentioned condition.

Figure 17B:
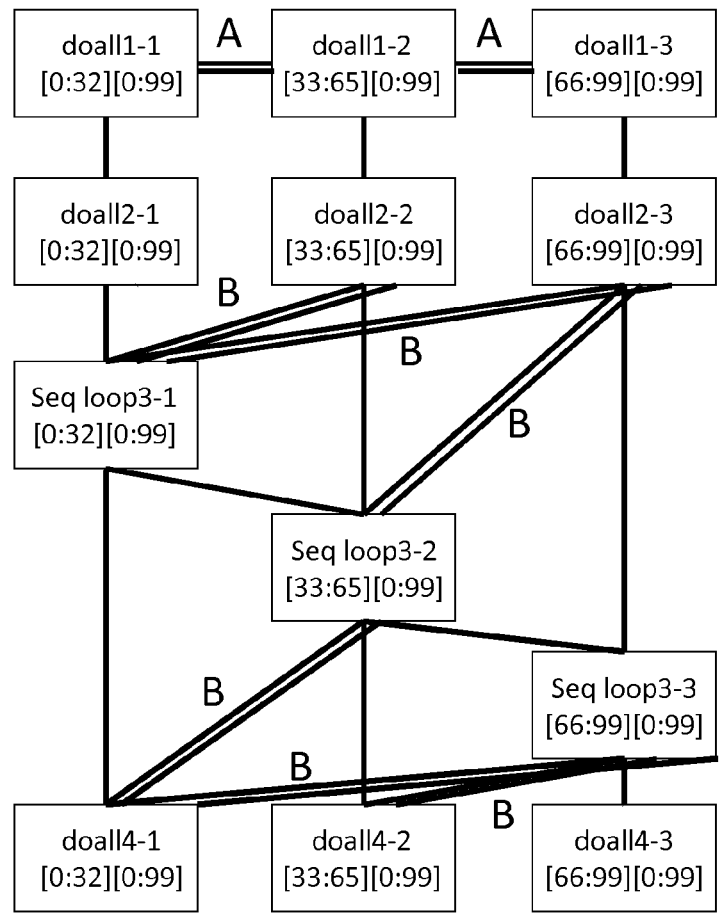
FIG. 17B is a macro-task graph illustrating processing performed after the loop division according to the embodiments of this invention.

FIG. 17B is a macro-task graph illustrating processing performed after the loop division according to the embodiments of this invention. In this example, the division number of the respective tasks is set to three, but the division number can be arbitrarily set.

In FIG. 17B, the solid line (single line) indicates the data dependence on the program, and the double line indicates a portion that is likely to cause the false sharing.

Figures 17C, 18:
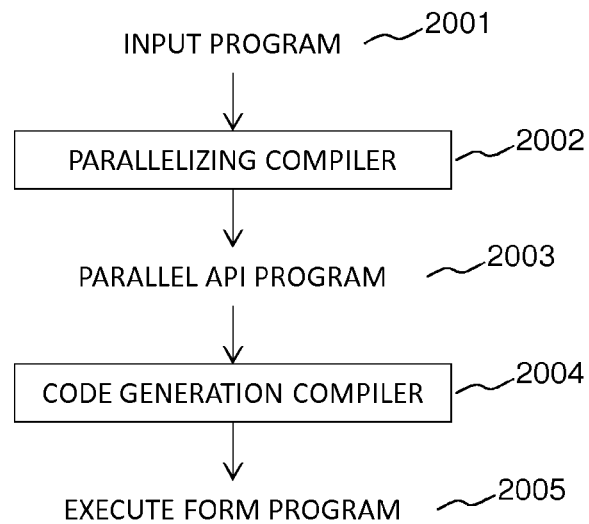
FIG. 17C is an explanatory diagram illustrating an example of a code for detecting the false sharing.
FIG. 18 is an explanatory diagram illustrating an outline of processing for generating a software coherency control code performed by a parallelizing compiler according to the embodiments of this invention.

It should be noted that FIG. 17C illustrates an example of a code for detecting the false sharing.

FIG. 18 is an explanatory diagram illustrating an outline of processing for generating a software coherency control code performed by a parallelizing compiler according to the embodiments of this invention.

First, a program 2001 to be compiled is input to a parallelizing compiler 2002. The input program 2001 is a sequential program described in a language such as C or Fortran.

The parallelizing compiler 2002 parallelizes the input sequential program, and generates a parallel API program 2003 into which a control code to be executed in a non-coherent cache is inserted. The generated parallel API program 2003 is of a parallel program format including an instruction (API) for executing the program by using the cache memory that does not have the coherency function.

The generated parallel API program 2003 is input to a code generation compiler 2004. The code generation compiler 2004 converts the program into a machine language command (execute form program) 2005 while interpreting the instruction (API) for executing the program by using the cache memory that does not have the coherency function. The execute form program 2005 also includes the command for executing the program in the non-coherent cache.

Figure 19:
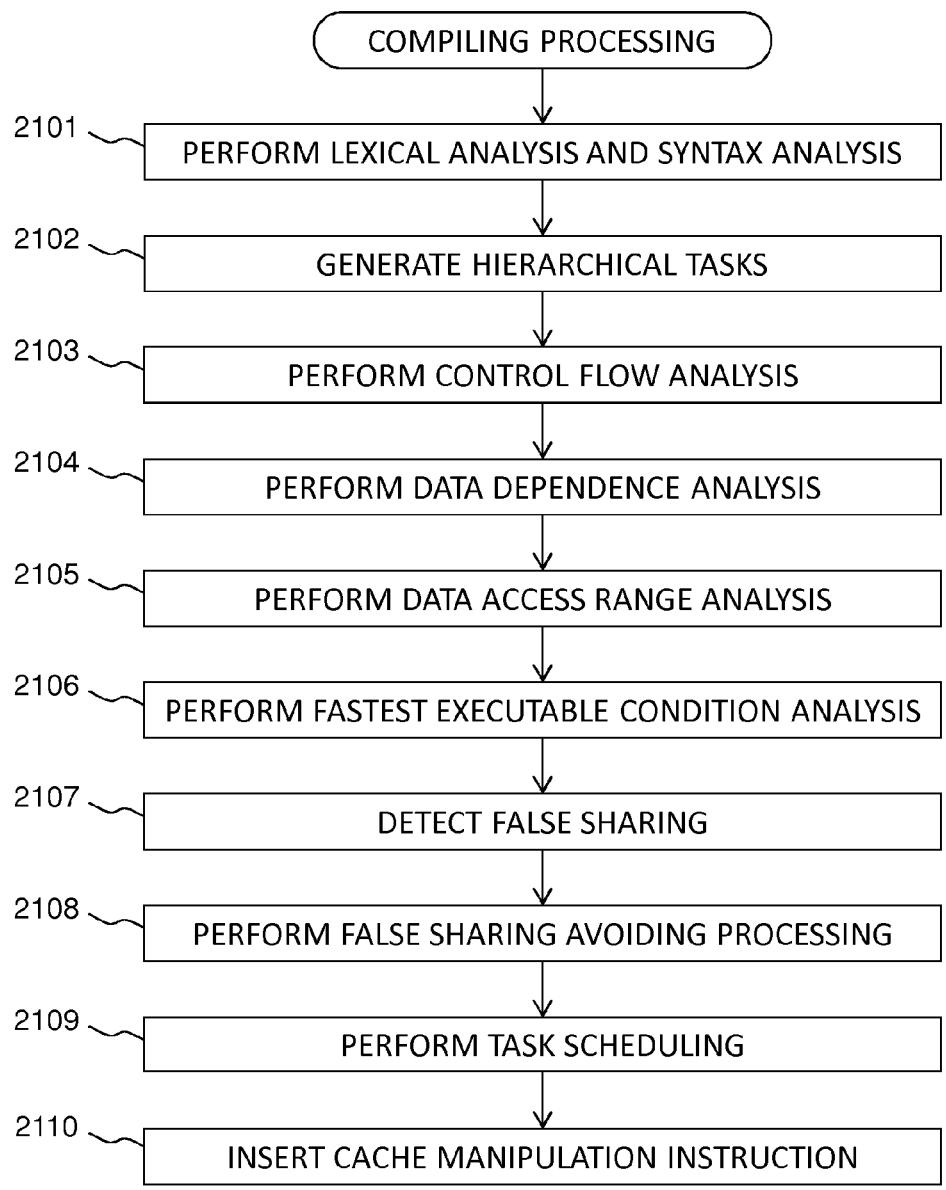
FIG. 19 is a flowchart of processing executed by a compiler according to the embodiments of this invention.

FIG. 19 is a flowchart of processing executed by the compiler according to the embodiments of this invention.

First, the compiler subjects the program to be compiled to a lexical analysis, and analyzes a syntax of the program (2101).

Based on a result of analyzing the syntax, a hierarchical task, an expression using a hierarchical macro-task of the program is generated (2102).

After that, a dependence relationship (control flow) between the generated tasks is analyzed (2103), the data dependence between the tasks is analyzed (2104), and a range of data accessed by each task is analyzed (2105).

After that, the result of analyzing the program is used to analyze conditions on which the program can be executed at the fastest speed (2106), and an analysis result of a fastest executable condition is used to determine a parallel processing segment and the number of processors to which the tasks are to be assigned and generate the macro-task graph.

After that, from the data dependence relationship within the macro-task graph, the false sharing is detected by the method which has been described referring to FIGS. 17A, 17B, and 17C, and the false sharing information including the portion in which the false sharing has been detected and the variable in which the false sharing has been detected is generated (2107).

After that, based on the generated false sharing information, the method of avoiding the false sharing is determined for each portion in which the false sharing has been detected, the command is inserted in accordance with the determined method, and a parallel program in which the false sharing is avoided is generated (2108). This false sharing avoiding processing is described in detail referring to FIGS. 20A and 20B.

After that, task scheduling for determining a sequence of executing the respective tasks is executed (2109), and a cache manipulation instruction for handling the stale data is inserted (2110). With this operation, the parallel program with a coherency control function is generated. Processing for inserting the cache manipulation instruction is described in detail referring to FIG. 21.

Figure 20A:
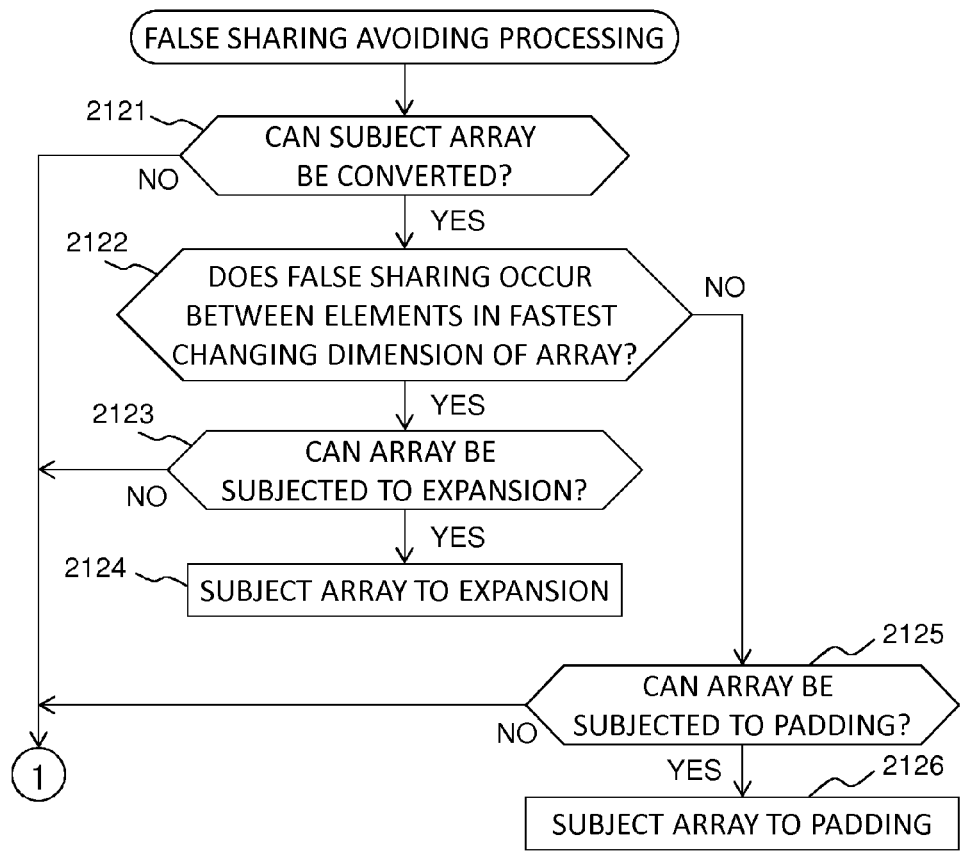
FIG. 20A is a flowchart of the false sharing avoiding processing according to the embodiments of this invention.
Figure 20B:
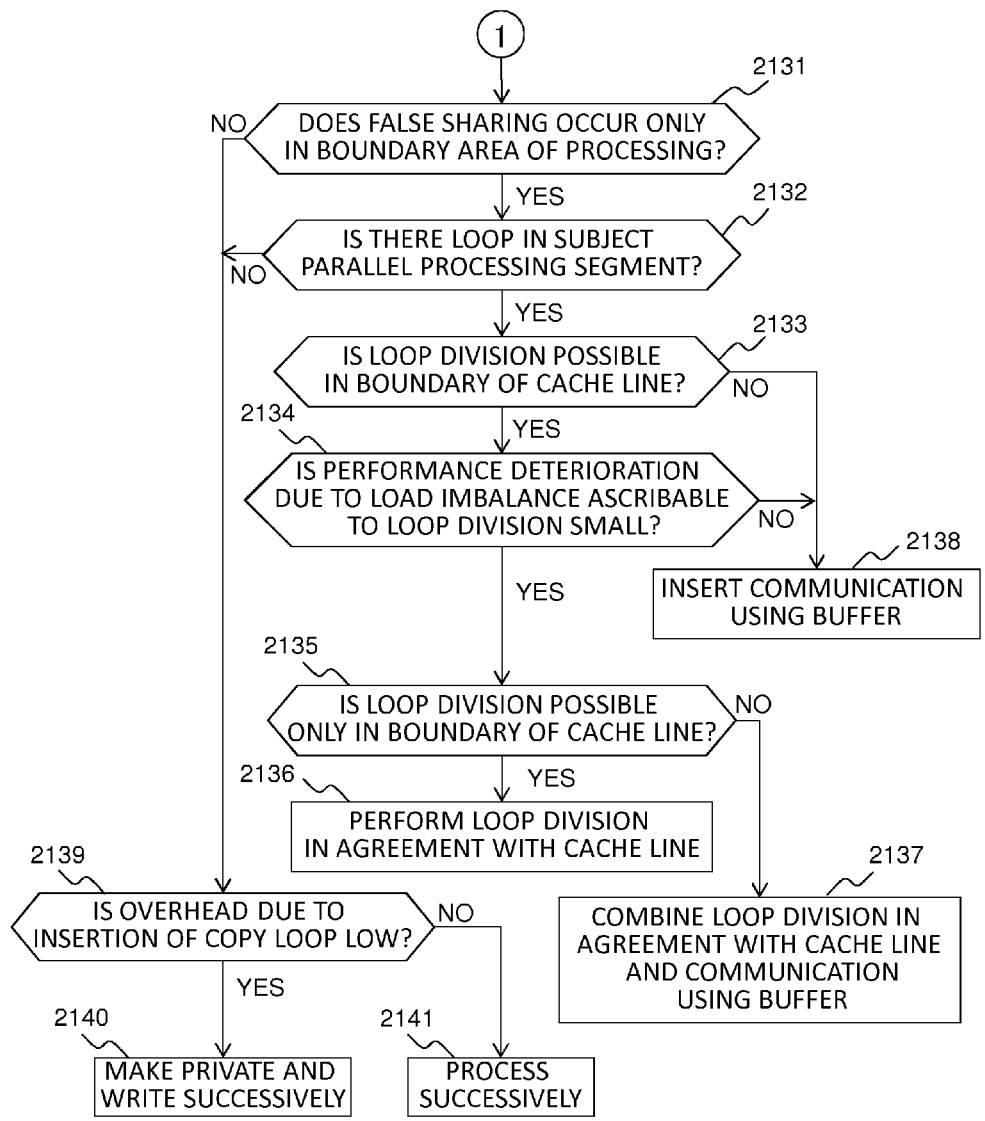
FIG. 20B is a flowchart of the false sharing avoiding processing according to the embodiments of this invention.

FIGS. 20A and 20B are flowcharts of the false sharing avoiding processing according to the embodiments of this invention, which is called from Step 2108 of compiling processing (FIG. 19).

In the false sharing avoiding processing illustrated in FIGS. 20A and 20B, the false sharing information detected in Step 2107 is used as an input, and the following processing is performed for each case of the false sharing that occurs in the same array.

The false sharing avoiding processing is broadly classified into data layout conversion and restructuring. FIG. 20A illustrates data layout conversion processing, and FIG. 20B illustrates restructuring processing.

First, it is determined whether or not the array variable to be processed can be converted (2121). For example, in a case where the array variable is closed within the program to be compiled, specifically, when the array variable is declared within the program to be compiled and is not to be an argument of a function defined outside the program, there is no probability that the conversion of a data layout causes the program to perform an unexpected operation, and hence it is determined that the array variable can be converted.

As a result, when it is determined that the array cannot be converted, the conversion of the data layout such as the expansion or padding of the array is difficult, and hence the procedure advances to Step 2131 (FIG. 20B) to perform the restructuring, On the other hand, when it is determined that the array can be converted, it is determined whether or not the false sharing occurs between the elements in a fastest changing dimension of the array (2122). Specifically, in an N-dimension array, the fastest changing dimension is defined as the first dimension, and a slowest changing dimension is defined as the N-th dimension. The fastest changing dimension represents a dimension of the array in which the subscript is continuously changed. For example, in a case where the N-dimension array is processed by the loop, the innermost loop becomes the fastest changing dimension, and an outermost loop becomes the slowest changing dimension. In other words, the data in the fastest changing dimension is placed in the continuous area on the memory.

As a result, when it is determined that the false sharing occurs between the elements in the fastest changing dimension, it is determined whether or not the array can be expanded (2123). In Step 2123, it is determined whether or not deterioration of performance ascribable to deterioration of cache use efficiency is small even when the array is expanded. For example, in a case where the array size is sufficiently small, the deterioration of the performance ascribable to the deterioration of the cache use efficiency is small even when the array is expanded as illustrated in FIG. 6A, and hence it is determined that the array can be expanded. Specifically, in a case where the following expression (1) is satisfied, the array size is sufficiently small, and hence it is determined that the array can be expanded.

$$Sa1 \leq S \times N \qquad (1)$$

Sa1: declared size of the subject array in the first dimension

S: cache line size

N: number of processors to be used

When it is determined as a result that the array can be expanded, by inserting the code illustrated in FIG. 6B into the program, the array is expanded as illustrated in FIG. 6A. On the other hand, when it is determined that it is difficult to subject the array to the expansion, the procedure advances to Step 2131 (FIG. 20B) to perform the restructuring.

On the other hand, in Step 2122, when it is determined that the false sharing occurs between the elements in a dimension other than the fastest changing dimension, it is determined whether or not the array can be padded (2125). In Step 2125, it is determined whether or not the deterioration of the performance ascribable to the deterioration of the cache use efficiency is small even when the array is padded. For example, in a case where the array size is sufficiently large, the deterioration of the performance ascribable to the deterioration of the cache use efficiency is small even when the array is padded, as illustrated in FIG. 13A, and hence it is determined that the array can be padded. Specifically, in a case where the following expression (2) is satisfied, the array size is sufficiently large, and hence it is determined that the array can be padded.

$$Sa2 \geq S \times N \qquad (2)$$

Sa2: partial array size at lower levels than the dimension in which false sharing occurs in the subject array variable S: cache line size N: number of processors to be used In a case where it is determined as a result that the array can be padded, by inserting the code illustrated in FIG. 13B into the program, the array is padded as illustrated in FIG. 13A. On the other hand, when it is determined that it is difficult to subject the array to the padding, the procedure advances to Step 2131 (FIG. 20B) to perform the restructuring.

In the restructuring processing illustrated in FIG. 20B, the following processing is performed on the false sharing that cannot be handled by the data layout conversion within the detected false sharing information.

First, it is determined whether or not the false sharing occurs only in the boundary area of the processing performed by the respective processors (2131).

Specifically, it is determined whether or not access to the array to be processed has continuous access. For example, in a case where the areas accessed by the respective processors after parallelization overlap each other (case where the PE0 has access as in i, i+2, i+4 . . . , while the PE1 has access as in i+1, i+3, i+5 . . . ), the access to the array to be processed is not the continuous access, and hence the false sharing occurs even outside the boundary area.

When it is determined as a result that the false sharing occurs even outside the boundary area, the procedure advances to Step 2139.

On the other hand, when it is determined that the false sharing occurs only in the boundary area, it is determined whether or not a location in which it is determined that the false sharing occurs is parallel processing using the loop (2132).

When it is determined as a result that the false sharing occurs outside the parallel processing using the loop, the procedure advances to Step 2139.

On the other hand, when it is determined that the false sharing occurs in the parallel processing using the loop, it is determined whether or not the loop division is possible in the boundary of the cache line (2133).

When it is determined as a result that the loop division is not possible in the boundary of the cache line, by inserting the code illustrated in FIG. 8B into the program, as illustrated in FIG. 8A, the buffer is used to perform communications between the processing elements (2138).

On the other hand, when it is determined that the loop division is possible in the boundary of the cache line, it is determined whether or not the deterioration of the performance due to an imbalance of load ascribable to the loop division is small (2134). For example, in a case where a loop rotation number is sufficiently large, it can be determined that the influence due to the imbalance of the load ascribable to the loop division is small. Specifically, in a case where the following expression (3) is satisfied, the loop rotation number is sufficiently large, and hence it can be determined that the influence due to the imbalance of the load ascribable to the loop division is small.

$$R \geq S \times N \quad (3)$$

R: loop rotation number
S: cache line size
N: number of processors to be used

Further, in a case where the tasks are evenly divided for the respective processors, a difference between a maximum value and a minimum value of a data amount (access range) used by the divided tasks may be compared with the line size to determine that the influence due to the imbalance of the load is a small when the difference is smaller than the line size.

When it is determined as a result that the influence due to the imbalance of the load ascribable to the loop division is large, by inserting the code illustrated in FIG. 8B into the program, as illustrated in FIG. 8A, the buffer is used to perform communications between the processing elements (2138). It should be noted that the method illustrated in FIGS. 10A and 10B may be used, and in the case of the multi-dimensional array, the method illustrated in FIGS. 15A and 15B is used.

On the other hand, when the influence due to the imbalance of the load ascribable to the loop division is small, it is determined whether or not the loop division is possible only in the boundary of the cache line (2135). For example, in a case where the elements of the array variable a[i] and a[i+1] are accessed within the same loop, the loop division is not possible only in the boundary of the cache line.

When it is determined as a result that the loop division is possible only in the boundary of the cache line, by inserting the code illustrated in FIG. 7B into the program, as illustrated in FIG. 7A, the loop is divided in the boundary of the cache line (2136). It should be noted that, in the case of the multi-dimensional array, the method illustrated in FIGS. 15A and 15B is used.

On the other hand, in the case where the elements of the array variable a[i] and a[i+1] are accessed within the same loop, when the loop division is not possible only in the boundary of the cache line, the code illustrated in FIG. 7B is inserted into the program at the portion at which the loop division is possible in the boundary of the cache line (for example, portion at which a[i] is divided). In addition, by inserting the code illustrated in FIG. 8B into the program at the portion at which the loop division is not possible in the boundary of the cache line (for example, portion at which a[i+1] is divided), as illustrated in FIG. 8A, the buffer is used to perform communications between the processing elements (2137).

For example, a[i] is loop divided in the boundary of the cache line, and with regard to a[i+1], the buffer may be used to perform communications between the processing elements. In this case, an access count of a[i] and an access count of a[i+1] may be compared with each other, and with regard to the subscript of the element of the array variable exhibiting a large access count, the loop division may be performed in the boundary of the cache line to lower the overhead of the communications of the data stored in the buffer.

On the other hand, in Step 2139, it is determined whether or not the overhead of copy processing from a private variable used in the arithmetic processing by each of the processing elements to the global variable is low. Specifically, in a case where a processing amount of the calculation executed in the loop is sufficiently large, the overhead of the copy processing is small enough to be ignored. For example, in a case where the data on another variable is simply substituted (copied) into a, the processing amount of the calculation executed in the loop is small, while in a case where a calculation result from the four fundamental arithmetic processing or a function in the loop is substituted into a, the processing amount of the calculation executed in the loop becomes large.

When it is determined as a result that the overhead of the copy processing for the variable is low, by inserting the code illustrated in FIG. 11 (code illustrated in FIG. 16 in the case of the multi-dimensional array) into the program, the arithmetic processing is performed by using the private variable defined in each of the processing elements, and the result of the arithmetic processing is copied from the private variable to the global variable (2140).

On the other hand, when it is determined that the overhead of the copy processing for the variable is high, the results from the arithmetic processing performed by the respective processing elements are successively written to the centralized shared memory 160 (2141).

Figure 21:
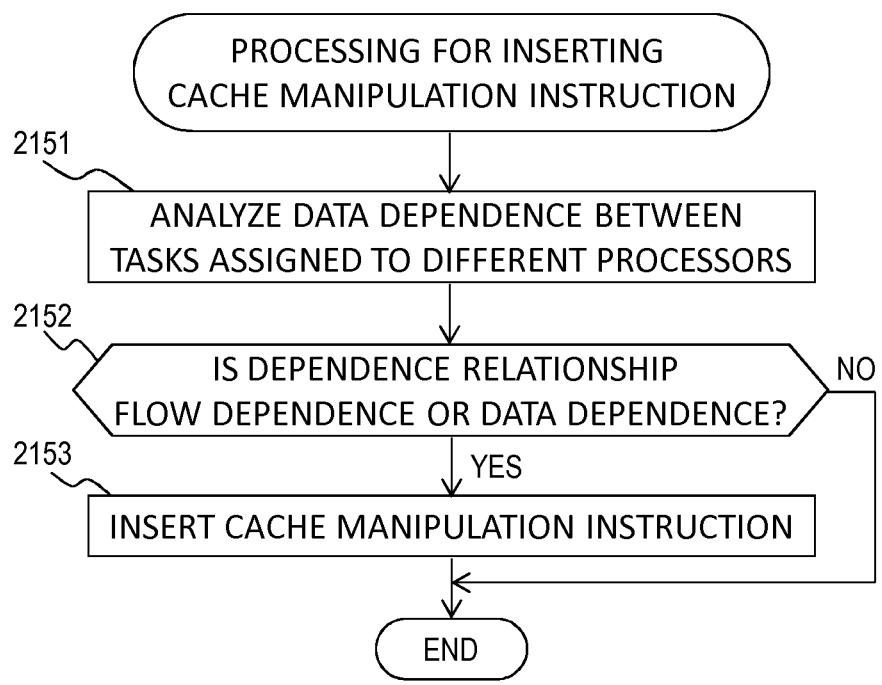
FIG. 21 is a flowchart of a processing for inserting a cache manipulation instruction according to the embodiments of this invention.
Figure 22:
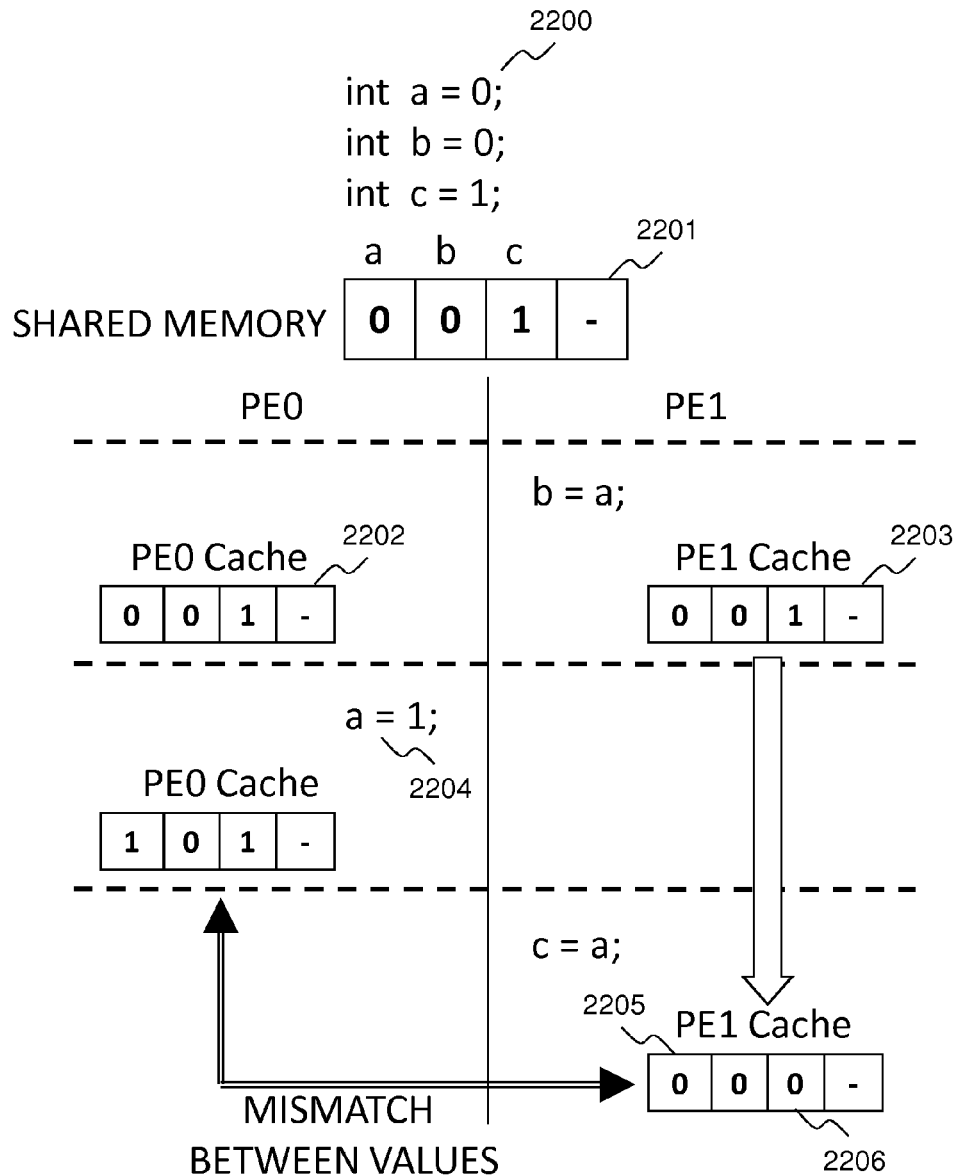
FIG. 22 is an explanatory diagram illustrating a first problem (stale data) in a coherency control.

FIG. 21 is a flowchart of the processing for inserting the cache manipulation instruction according to the embodiments of this invention.

First, in a result of scheduling a task graph in a parallelization phase, the data dependence between the tasks assigned to the different processors is analyzed (2151).

It is determined whether or not the dependence relationship of the analyzed data is the flow dependence or the output dependence (2152). When it is determined as a result that the dependence relationship of the analyzed data is the flow dependence or the output dependence, the cache manipulation instruction is inserted (2153).

Specifically, in the same manner as described above with reference to FIG. 3B, the cache manipulation instruction that the processing element that produces the data write back, after updating the data, the updated data to the main memory (centralized shared memory 160) in accordance with the writeback command and the cache manipulation instruction that the processing element that consumes the data read, before consuming the data, the data from the main memory in accordance with the self-invalidate command are generated, and the generated cache manipulation instructions are inserted into the program. At this time, the processing element that consumes the data is controlled to be notified by the flag that the processing element that produces the data has finished updating the data, and the processing element that consumes the data is controlled to learn the update of the data from the updated flag and read the updated data from the main memory. The compiler generates the control command using the flag, and inserts the generated control command into the program.

On the other hand, when the dependence relationship of the analyzed data is not the flow dependence or the output dependence, the processing for inserting the cache manipulation instruction is brought to an end.

As described above, according to the embodiments of this invention, control performed by software allows hardware for the coherency control to be unnecessary, which can simplify the hardware. Therefore, it is possible to realize a low-cost and low-power-consumption multiprocessor system. Further, optimization of the compiler enables an improvement in scalable performance.

Representative aspects of this invention other than the aspects disclosed in the claims include the following.

(1) A multiprocessor system, including:
a plurality of processing elements; and
a main memory that can be accessed from each of the plurality of processing elements, in which:
the each of the plurality of processing elements includes a processor for performing arithmetic processing and a cache memory for temporarily storing data used by the processor,
the each of the plurality of processing elements is configured to:
temporarily store the data read and transferred from the main memory into the cache memory;
transfer the data whose use has been finished from the cache memory in accordance with a management unit of the cache memory and write back to the main memory; and
provide a non-cacheable area from which the data to be stored in the management unit including the boundary is not temporarily stored into the cache memory in a case where a boundary of the data used by respective tasks generated by dividing a program is not consistent with the management unit of the cache memory, and store an arithmetic processing result stored in the management unit including the boundary into the non-cacheable area.

(2) The multiprocessor system according to the above-mentioned item (1), in which:
the plurality of processing elements include at least a first processing element and a second processing element;
the first processing element performs the arithmetic processing in the cache memory on the data stored in the management unit including the boundary of the data used by the tasks;

the second processing element is configured to:
perform, in the non-cacheable area, the arithmetic processing on the data stored in the management unit including the boundary of the data used by the tasks; and transfer a result of performing the arithmetic processing in the non-cacheable area to the cache memory of the first processing element.

(3) The multiprocessor system according to the above-mentioned item (1), in which:
the plurality of processing elements include a first processing element and a second processing element;
the non-cacheable area is provided to the each of the plurality of processing elements;
the each of the plurality of processing elements performs the arithmetic processing in the non-cacheable area of the each of the plurality of processing elements on the data stored in the management unit including the boundary of the data used by the divided tasks; and
the first processing element writes a result of performing the arithmetic processing in the non-cacheable area to a shared memory of the second processing element.

(4) The multiprocessor system according to any one of the above-mentioned items (1) to (3), in which, in a case where there is a dependence relationship between the tasks executed by different ones of the plurality of processing elements:
one of the plurality of processing elements that produces the data writes back the data exhibiting the dependence relationship to the main memory; and
another one of the plurality of processing elements that consumes the data invalidates the data exhibiting the dependence relationship.

(5) A program for controlling a processor provided to a multiprocessor system to execute arithmetic processing,
the multiprocessor system including a plurality of processing elements and a main memory that can be accessed from each of the plurality of processing elements,
the each of the plurality of processing elements including a processor for performing arithmetic processing and a cache memory for temporarily storing data used by the processor,
the data read by the each of the plurality of processing elements from the main memory being temporarily stored in the cache memory,
the data whose use by the each of the plurality of processing elements has been finished being written back from the cache memory to the main memory,
the data being transferred between the main, memory and the cache memory in accordance with a management unit of the cache memory,
the program including a step of providing a non-cacheable area from which the data to be stored in the management unit including the boundary is not temporarily stored into the cache memory in a case where a boundary of the data used by respective tasks is not consistent with the management unit of the cache memory and of storing an arithmetic processing result stored in the management unit including the boundary into the non-cacheable area.

(6) The program according to the above-mentioned item (5), in which
the plurality of processing elements include a first processing element and a second processing element and
the step of storing the arithmetic processing result into the non-cacheable area includes:

a step of performing, by the first processing element, the arithmetic processing in the cache memory on the data stored in the management unit including the boundary of the data used by the tasks;

a step of storing, by the second processing element, the arithmetic processing result stored in the management unit including the boundary of the data used by the tasks into the non-cacheable area; and a step of transferring, by the second processing element, the arithmetic processing result stored in the non-cacheable area to the cache memory of the first processing element.

(7) The program according to the above-mentioned item (5), in which:

the plurality of processing elements include a first processing element and a second processing element;

the non-cacheable area is provided to the each of the plurality of processing elements; and the step of storing the arithmetic processing result into the non-cacheable area includes:

a step of performing, by the each of the plurality of processing elements, the arithmetic processing in the non-cacheable area of the each of the plurality of processing elements on the data stored in the management unit including the boundary of the data used by the tasks; and a step of writing, by the first processing element, a result of performing the arithmetic processing in the non-cacheable area to a shared memory of the second processing element.

(8) The program according to any one of the above-mentioned items (5) to (7), further including, in a case where there is a dependence relationship between the tasks executed by different ones of the plurality of processing elements:

a step of writing back, by one of the plurality of processing elements that produces the data, the data exhibiting the dependence relationship to the main memory in a case where there is a dependence relationship between the tasks executed by different ones of the plurality of processing elements; and a step of invalidating, by another one of the plurality of processing elements that consumes the data, the data exhibiting the dependence relationship.

While the present invention has been described in detail and pictorially in the accompanying drawings, the present invention is not limited to such detail but covers various obvious modifications and equivalent arrangements, which fall within the purview of the appended claims.

What is claimed is:

1. A method implemented by a compiler, comprising:
performing a first analysis of a program to be executed by a multiprocessor system, wherein the first analysis includes a lexical and syntax analysis, the multiprocessor system includes a plurality of processing elements and a first memory accessible by each processing element, and each processing element includes a processor and a second memory including a cache memory;
dividing the program into tasks, based on the first analysis, wherein each of the tasks is to be assigned to corresponding one of the processing elements;
performing a second analysis, wherein the second analysis includes an analysis of data dependency among the tasks and an analysis of a range of data to be used in performing a corresponding task among the tasks;
determining, based on the second analysis, whether a boundary of the data to be used in performing the corresponding task is consistent with a boundary of a line, wherein the line is defined as a data management unit of the first memory and the second memory, and data transfer is performed between the first memory and the second memory for each line;
when a boundary of data that is not consistent with the boundary of the line is determined, generating a first code instructing to provide a non-cacheable area in the first memory, wherein data stored in the non-cacheable area is a part of the data to be used in performing the corresponding task, and is not transferred to the second memory;
generating a second code instructing to store, in the non-cacheable area, a result of arithmetic processing using the data stored in the non-cacheable area; and
generating a parallel program which includes the generated first code and the generated second code and is executable by the multiprocessor system.

2. The method of claim 1, further comprises:
in response to or after determining that a first boundary between first data and second data is not consistent with the boundary of the line, wherein a first processing element consumes the first data in performing a first task, a second processing element consumes the second data in performing a second task, the first processing element and the second processing element are ones of the plurality of processing elements, and the first task and the second task are ones of the tasks,
generating a fourth code instructing the second processing element to perform arithmetic processing using the data stored in the non-cacheable area, wherein the data stored in the non-cacheable area is a part of the line;
generating a fifth code instructing the second processing element to store, in the non-cacheable area, a result of the arithmetic processing using the data stored in the non-cacheable area, and
generating a sixth code instructing a first processor in the first processing element to read from the non-cacheable area and write to a first cache memory, the result of the arithmetic processing by a second processor in the second processing element using data stored in the non-cacheable area,
wherein the parallel program includes the fourth code, the fifth code, and the sixth code.

3. The method of claim 1, further comprising:
in response to or after determining that a first boundary between first data used in performing a first task performed by a first processing element and second data used in performing a second task performed by a second processing element is not consistent with the boundary of the line, wherein the first processing element and the second processing element are among the processing elements, and the first task and the second task are among the tasks,
generating a seventh code instructing the first processing element to perform, using a non-cacheable area provided in a first distributed shared memory of the first processing element, arithmetic processing using data which are stored in a part of a line in the first distributed shared memory and instructing the second processing element to perform, using a non-cacheable area provided in a second distributed shared memory of the second processing element, another arithmetic processing using data stored in a part of the line in the second distributed shared memory; and
generating an eighth code instructing the first processing element to write, to a shared memory of the second processing element, a result of the arithmetic processing performed in a non-cacheable area associated with the first processing element, wherein the parallel program includes the seventh code and the eighth code.

4. The method of claim 1, further comprising:

generating a ninth code instructing to provide a non-cacheable-area in a main memory, wherein the parallel program includes the ninth code.

5. The method of claim 1, further comprising:

generating a tenth code instructing to provide a non-cacheable area in a distributed shared memory accessible by each processing element, wherein the parallel program includes the tenth code.

6. The method of claim 1, further comprising:

in response to or after determining the corresponding task can be divided so as to make boundary of data used in performing divided tasks be consistent with a boundary of a line, dividing the corresponding task into a third task and a fourth task wherein a boundary between third data used in performing the third task and fourth data used in performing is consistent with the boundary of the line, and generating an eleventh code instructing a third processing element among the processing elements to perform the third task and instructing a fourth processing element among the processing elements to perform the fourth task, wherein the parallel program includes the eleventh code.

7. The method of claim 1, further comprising:

when it is determined, based on the first analysis, that the data to be used in performing the corresponding task is declared in the program, and used only in performing the corresponding task, generating a twelfth code instructing expansion of a data array to avoid placing a plurality of elements of the data in multiple lines, wherein each line of the multiple lines is defined as a data management unit of the first memory and the second memory, wherein the parallel program includes the twelfth code.

8. The method of claim 1, wherein the data to be used in performing the corresponding task is an array variable, the method further comprising:

identifying a portion in which a boundary of the data to be used in performing the corresponding task is inconsistent with a boundary of a line, wherein each line of multiple lines is defined as a data management unit of the first memory and the second memory, when the identified portion is located in elements in a dimension of the array variable, generating a thirteenth code instructing expansion of the array variable so as not to place, in each line, a plurality of elements in the array variable, wherein the elements in the dimension of the array variable are stored in a continuous area of the first memory; and when the identified portion is not located between the elements in the dimension of the array variable, generating a fourteenth code instructing expansion of the array variable so as not to place, in each line, elements in dimensions lower than a dimension in which the boundary of the data to be used in performing the corresponding task is inconsistent with the boundary of the line, wherein the parallel program includes the thirteenth code and the fourteenth code.

9. The method of claim 1, further comprising:

generating a fifteenth code instructing to define a local variable to be used in a first processing element and a second processing element, wherein the first processing element and the second processing element are among the processing elements;

generating a sixteenth code instructing each of the first processing element and the second processing element to perform arithmetic processing using the local variable;

generating a seventeenth code instructing the first processing element to write back, to the first memory, a result of the arithmetic processing performed by the first processing element;

generating an eighteenth code instructing the second processing element to read, from the first memory, the result of the arithmetic processing performed by the first processing element; and generating a nineteenth code instructing the second processing element to write, to the second memory, the read result of the arithmetic processing performed by the first processing element, wherein the parallel program includes the fifteenth code, the sixteenth code, the seventeenth code, the eighteenth code and the nineteenth code.

10. The method of claim 1, further comprising:

when data dependency exists between tasks performed by different processing elements among the processing elements, generating a twentieth code instructing a first processing element among the processing elements to write back data used in performing a first task having data dependency to data to be used in performing a second task performed by a second processing element among the processing elements to the first memory; and generating a twenty-first code instructing the second processing element to invalidate data, wherein the second processing element reads before writing back by the first processing element, having the data dependency to the data used in performing the first task by the first processing element, wherein the first processing element produces the data having the data dependency, and the second processing element consumes the data having the data dependency, and wherein the parallel program includes the twentieth code and the twenty-first code.

11. A method comprising:

temporally storing, by one of processing elements in a multi-processing system, in a second memory including a cache memory associated with the one of the processing elements, data which is read and transferred from a first memory accessible by each processing element, in the multi-processing system;

after data is used by one of the processing elements, transferring the data from the second memory; and writing back the data to the first memory for each line, wherein each line is defined as a data management unit of the first memory and the second memory; and when a program is divided into tasks, each of which is to be assigned to corresponding one of the processing elements, and after a boundary between first data and second data, which are parts of the data stored in each line, is determined to be inconsistent with a boundary of each line, wherein the first data is to be used by a first processing element in performing a first task, the second data is to be used by a second processing element in performing a second task, the first processing element and the second processing element are ones of the plurality of processing elements, and the first task and second task are ones of the tasks, providing a non-cacheable area in the first memory, wherein data stored in the non-cacheable area is a part of the data to be used in performing the corresponding task, and is not transferred to the second memory, and storing, in the non-cacheable area, a result of arithmetic processing, wherein the result of the arithmetic processing is stored in a part of the line, and the part of the line is beyond the boundary between the first data and the second data.

12. The method of claim 11, wherein storing, in the non-cacheable area, the result of arithmetic processing stored in the part of the line includes:

storing, by the second processing element among the processing elements, the result of arithmetic processing in the non-cacheable area, and transferring, by the first processing element, to the second memory associated with the first processing element among the processing elements, the result stored in the non-cacheable area.

13. The method of claim 11, wherein storing, in the non-cacheable area, the result of arithmetic processing stored in the part of the line includes:

performing arithmetic processing, by each processing element, using a non-cacheable area in a distributed shared memory of each processing element, using data stored in a line which includes a boundary of the data to be used in performing the tasks;

performing, by the first processing element among the processing elements, using a non-cacheable area in a first distributed shared memory of the first processing element, arithmetic processing using data stored in a part of the line in the second memory, performing, by the second processing element, in a non-cacheable area associated with the second processing element, another arithmetic processing using the data stored in a part of the line in the second memory, and writing, to a shared memory of the second processing element, the result of the arithmetic processing performed in a non-cacheable area associated with the first processing element and the result of the arithmetic processing performed using the non-cacheable area associated with the second processing element.

14. The method of claim 11, further comprising:

when data dependency exists between tasks performed by different processing elements among the processing elements, writing back, by the first processing element among the processing elements, the first data used in performing the first task having data dependency to the second data to be used in performing the second task performed by the second processing element among the processing element, to the first memory; and invalidating, by the second processing element, the second data, wherein the second processing element before writing back by the first processing element, has data dependency to the first data used in performing the first task by the first processing element, wherein the first processing element produces data having the data dependency, and the second processing element consumes the data having the data dependency.

15. The method of claim 1, wherein the second analysis includes at least one of an analysis of data dependency or an analysis of a range of the data to be used in performing the corresponding task.

* * * * *